(12) United States Patent
Ishida

(10) Patent No.: US 7,379,198 B1
(45) Date of Patent: May 27, 2008

(54) PRINTER FOR COMMUNICATING COMMANDS WITH HOST DEVICE AND METHOD OF CONTROLLING SAID PRINTER

(75) Inventor: Goro Ishida, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 899 days.

(21) Appl. No.: 09/656,310

(22) Filed: Sep. 6, 2000

(30) Foreign Application Priority Data

| Sep. 6, 1999 | (JP) | ................................. 11-252242 |
| Sep. 6, 1999 | (JP) | ................................. 11-252268 |
| Sep. 6, 1999 | (JP) | ................................. 11-252269 |
| Sep. 6, 1999 | (JP) | ................................. 11-252270 |
| Sep. 6, 1999 | (JP) | ................................. 11-252271 |
| Sep. 6, 1999 | (JP) | ................................. 11-252272 |

(51) Int. Cl.
*G06F 15/00* (2006.01)

(52) U.S. Cl. ..................... 358/1.15; 358/1.15; 358/1.13

(58) Field of Classification Search .......... 358/1.1–1.9, 358/1.11–1.18, 1.13, 1.15; 709/246, 206, 709/228, 230; 707/10, 104; 705/1, 26; 455/426.1; 400/70, 76
See application file for complete search history.

(56) References Cited

U.S. PATENT DOCUMENTS

| 5,138,696 | A | * | 8/1992 | Nagata ........................ 358/1.15 |
| 5,218,460 | A | * | 6/1993 | Nakajima .................... 382/181 |
| 5,800,073 | A | * | 9/1998 | Matsuda et al. ............... 400/74 |
| 6,018,515 | A | * | 1/2000 | Sorber ........................ 370/229 |
| 6,040,670 | A | * | 3/2000 | Kaneko et al. ............. 318/561 |
| 6,061,738 | A | * | 5/2000 | Osaku et al. ................ 709/245 |
| 6,184,996 | B1 | * | 2/2001 | Gase .......................... 358/1.15 |
| 6,273,535 | B1 | | 8/2001 | Inoue et al. |
| 6,307,637 | B1 | * | 10/2001 | Kujirai ....................... 358/1.11 |
| 6,411,396 | B1 | * | 6/2002 | Benson et al. ............. 358/1.18 |
| 6,552,743 | B1 | * | 4/2003 | Rissman ................... 348/207.2 |

FOREIGN PATENT DOCUMENTS

| DE | 43 33 576 | | 4/1994 |
| EP | 0 573 983 | | 12/1993 |
| EP | 0 827 106 | | 3/1998 |
| EP | 0827106 | * | 4/1998 |

(Continued)

OTHER PUBLICATIONS

Pipeline Corporation, Hard Copy Observer, Mar. 1997.*

(Continued)

*Primary Examiner*—Thomas D. Lee
*Assistant Examiner*—Saeid Ebrahimi
(74) *Attorney, Agent, or Firm*—Osha Liang LLP

(57) ABSTRACT

Provided is a printer which receives inquiry information relating to the print setting sent from a host device, sends to the host device reply information based on its characteristic information in response to the received inquiry information, receives print setting information sent from the host device based on the reply information, requests print object data to the host device in accordance with the received print setting information, receiving the print object data sent from the host device in accordance to the request, and prints the received print object data. Thereby, the present invention enables a host device to make a printer print document data in the host device without requiring conventional printer drivers.

5 Claims, 33 Drawing Sheets

FOREIGN PATENT DOCUMENTS

| | | |
|---|---|---|
| EP | 0 859 326 A2 | 8/1998 |
| EP | 0 881 817 A2 | 12/1998 |
| JP | H07-323608 | 12/1995 |
| JP | 9-114608 | 5/1997 |
| JP | 9-198205 | 7/1997 |
| JP | 10-100514 | 4/1998 |
| JP | H10-111771 | 4/1998 |
| JP | 10-191226 | 7/1998 |
| JP | 10-198529 | 7/1998 |
| JP | 10-229544 | 8/1998 |
| JP | 10-235975 | 9/1998 |
| JP | H11-091209 | 4/1999 |
| JP | 11-136496 | 5/1999 |
| JP | 11-184657 | 7/1999 |
| JP | 2001-071594 | 3/2001 |
| JP | 2001-071595 | 3/2001 |
| JP | 2001-071596 | 3/2001 |
| JP | 2001-75753 | 3/2001 |
| JP | 2001-75760 | 3/2001 |
| JP | 2001-075761 | 3/2001 |
| JP | 2001-75761 | 3/2001 |

OTHER PUBLICATIONS

M. Sullivan, "Enhanced Paper Stock Options and Feedback for Network Jobs," Xerox Disclosure Journal, Xerox Corporation, Stamford, CT, USA, vol. 21, No. 2, Mar. 1, 1996, pp. 129-130.

European Patent Office Search Report, Dec. 17, 2002, 2 pgs.

Notice of Reasons For Refusal for Patent Application No. Hei 11-252242 dated May 6, 2005 and English translation thereof, 3 pages.

Patent Abstract of Japan, Publication No. 10-191226, publication date Jul. 21, 1998, 2 pages.

Notice of Reasons for Refusal dated Jun. 17, 2005 for Patent Application No. 11-252271 (2 pages).

Notice of Reasons for Refusal dated Jun. 17, 2005 for Patent Application No. 11-252268 (2 pages).

Patent Abstracts of Japan; Publication No. 10-100514 dated Apr. 21, 1998 with English Translation (25 pages).

Patent Abstracts of Japan; Publication No. 2001-075761 dated Mar. 23, 2001 with English Translation (51 pages).

Patent Abstracts of Japan; Publication No. 09-114608 dated May 2, 1997 with English Translation (46 pages).

Patent Abstracts of Japan; Publication No. 09-198205 dated Jul. 31, 1997 with English Translation (19 pages).

Patent Abstracts of Japan; Publication No. 10-235975 dated Sep. 8, 1998 with English Translation (48 pages).

Patent Abstracts of Japan; Publication No. 2001-075753 dated Mar. 23, 2001 with English Translation (52 pages).

European Official Action issued for European Application No. 00307652.8-1248 dated May 9, 2005 (6 pages).

Japanese Decision of Refusal issued for Japanese Application No. 11-252242 dated Nov. 1, 2005 (2 pages)—English Translation of Decision of Refusal (3 pages).

Patent Abstracts of Japan (English Translation); Publication No. 07-323608; Dated Dec. 12, 1995; (25 pages).

Patent Abstracts of Japan (English Translation); Publication No. 11-091209; Dated Apr. 6, 1999; (18 pages).

Patent Abstracts of Japan (English Translation); Publication No. 10-111771; Dated Apr. 28, 1998; (52 pages).

Patent Abstracts of Japan (English Translation); Publication No. 2001-071596; Dated Mar. 21, 2001; (43 pages).

Patent Abstracts of Japan (English Translation); Publication No. 2001-071595; Dated Mar. 21, 2001; (53 pages).

Patent Abstracts of Japan (English Translation); Publication No. 2001-071594; Dated Mar. 21, 2001; (53 pages).

Patent Abstracts of Japan (English Translation); Publication No. 2001-075761; Dated Mar. 23, 2001; (50 pages).

Notice of Reasons for Refusal (with English Translation); Japanese Application No. 11-252272 dated Mar. 29, 2006 (5 pages).

Notice of Reasons for Refusal (with English Translation); Japanese Application No. 11-252269 dated Mar. 29, 2006 (5 pages).

Notice of Reasons for Refusal (with English Translation); Japanese Application No. 11-252270 dated Mar. 29, 2006 (5 pages).

Patent Abstracts of Japan w/English Translation; Publication No. 2001-075760 dated Mar. 23, 2001 (53 pages).

Patent Abstracts of Japan w/English Translation; Publication No. 10-229544 dated Aug. 25, 1998 (57 pages).

Patent Abstracts of Japan w/English Translation; Publication No. 11-184657 dated Jul. 9, 1999 (36 pages).

Patent Abstracts of Japan; Publication No. 11-136496 dated May 21, 1999 (19 pages).

Patent Abstracts of Japan; Publication No. 10-198529 dated Jul. 31, 1998 (31 pages).

* cited by examiner

FIG.5

| [m: qlty] set printing quality | | | host –> printer |
|---|---|---|---|

| param. ID | value length | contents |
|---|---|---|
| M | 2 | media quality (media) |

| 0 | Plain Paper |
|---|---|
| 1 | Fine Paper |
| 2 | Super Fine Paper |
| 3 | Transparency |
| 4 | Glossy Film |
| 5 | Glossy Paper |
| 6 | Back Print Film |

| Q | 1 | quality (quality) |
|---|---|---| lowest picture quality <————————————————> highest picture quality

0                                15

| P | 6 | color management for photograph (cmpht) |
|---|---|---|
| T | 6 | color management for text and graph (cmtxt) |

| Br | Cn | St | R | G | B |
|---|---|---|---|---|---|

Br : Brightness
Cn : Contrast
St : Saturation
R : Red
G : Green
B : Blue

| B | 1 | black and white printing (bwprt) |
|---|---|---|

| 0 | color printing |
|---|---|
| 1 | black and white printing |

FIG.6

| | | |
|---|---|---|
| W | 1 | micro weave (mcrwev) |

| 0 | microwave off |
|---|---|
| 1 | standard microwave |
| 2-265 | expansion microwave |

| | | |
|---|---|---|
| D | 1 | printing direction control (directl) |

| 0 | two-way printing |
|---|---|
| 1 | one-way printing |

| | | |
|---|---|---|
| H | 1 | halftone (hftone) |

| 0 | dither (high speed) |
|---|---|
| 1 | error deffusion (high picture quality) |

| | | |
|---|---|---|
| Z | 1 | dot size (dotsz) |
| H | 2 | horizontal resolution (hres) |
| V | 2 | vertical resolution (vres) |
| L | 2 | ID of user defined LUT (lut-id) |

FIG.7

[m: slut] set user defined LUT                                       host –⟩ printer

| param. ID | value length | contents |
|-----------|--------------|----------|
| 1 | 2 | ID (id) |
| + | 4 | data length (dtlen) |

FIG.8

[p: inqa] Inquire page availability                    host -> printer

| param. ID | value length | contents |
|---|---|---|

D        2        denominator (denomi)

FIG.9

[p: rpla] reply page availability                    host ←– printer

| param. ID | value length | contents |
|---|---|---|
| D | 2 | denominator (denomi) |
| W | 4 | maximum width (width) |
| H | 4 | maximum height (height) |
| T | 4 | minimum top margin (tmrgin) |
| L | 4 | left margin (lmrgin) |
| R | 4 | minimum right margin (rmrgin) |
| B | 4 | minimum bottom margin (bmrgin) |

FIG.10

[p: make] make page                                    host –⟩ printer

| param. ID | value length | contents |
|---|---|---|
| D | 2 | denominator (denomi) |
| W | 4 | width (width) |
| H | 4 | height (height) |
| T | 4 | top margin (tmrgin) |
| A | 1 | arrangement |

| 0 | automatic arrangement |
|---|---|
| 1 | individual arrangement |
| 2 | perpendicular serial arrangement |

| param. ID | value length | contents |
|---|---|---|
| H | 2 | horizontal division (hdiv) |
| V | 2 | vertical division (hdiv) |
| X | 1 | horizontal padding ratio (hpadd) |
| Y | 1 | vertical padding ration (vpadd) |

FIG.11

[p: fini] page finished         host ← printer

| param. ID | value length | contents |
|---|---|---|
| S | 2 | Status (status) |

| 0 | normal termination |
|---|---|
| 1 | abnormal termination |
| 2 | suspension due to [p:term] |
| 3 | reception of [p:term] after completion of processing |

FIG.12

| [o: req#] request object numbers | | | host –⟩ printer |
|---|---|---|---|

| param. ID | value length | contents |
|---|---|---|
| N | 2 | number of object numbers (nobj) |

FIG.13

| [p: endp] end of page | | | host –⟩ printer |
|---|---|---|---|

| param. ID | value length | contents |
|---|---|---|
| S | 1 | eject (eject) |

| 0 | no paper feed after completion of printing |
|---|---|
| 1 | paper feed after completion of printing |

FIG.14

[p: term] terminate page                              host –⟩ printer

| param. ID | value length | contents |
|-----------|--------------|----------|

E     1     eject (eject)

| 0 | no paper feed after suspension |
|---|-------------------------------|
| 1 | paper feed after suspension   |

FIG.15

[o:iss#] issue object numbers                                    host ← printer

| param. ID | value length | contents |
|---|---|---|

| N | 2 | number of object numbers (nobj#) |
| # | 2 | object number (obj#) |

FIG.16

[o:mkim] make image object                                      host –> printer

| param. ID | value length | contents |
|---|---|---|
| # | 2 | object number (obj#) |
| D | 2 | denominator (denomi) |
| X | 4 | horizontal position (xpos) |
| Y | 4 | vertical position (ypos) |
| W | 4 | printing area width (width) |
| H | 4 | printing area height (height) |
| R | 1 | rotate (rotate) |

| 0 | no rotation |
|---|---|
| 1 | 90 degree in the clockwise direction |
| 2 | 180 degrees |
| 3 | 90 degrees in the counterclockwise direction |
| 4 | no rotation or 90 degrees in the clockwise direction |
| 5 | no rotation or 90 degrees in the counterclockwise direction |

| F | 1 | aspect fitting (aspfit) |
|---|---|---|

| 0 | fitting of image data |
|---|---|
| 1 | fitting of object deveopmental area |
| 2 | fitting of both image data and object developmental area |

FIG.17

| A | 2 | alignment (align) | upper bytes: vertical arrangement

| 0 | arrange upper end |
|---|---|
| 1 | arrange center portion |
| 2 | arrange lower end | lower bytes: horizontal arrangement

| 0 | arrange left end |
|---|---|
| 1 | arrange center portion |
| 2 | arrange right end |

| Q | 1 | quick decoding (quick) |

| 0 | no high-speed development |
|---|---|
| 1 | high-speed development |

| I | 1 | intent (intent) |

| 0 | photograph |
|---|---|
| 1 | text/graph |

| Z | 4 | size of image data (dtsize) |

FIG.18

| P | 2 | photo creation (photor) |

| 0 | no application of APF |
|---|---|
| 1 | application of APF |
| 2 | application of simplified APF | lower bytes : APF applicable items

| - | MH | MS | MG | S | D | T |
|---|----|----|----|---|---|---|

T : tone (0: standard, 1: contrast, 2: sepia color)
D : correction for digital camera
S : sharpness (0: off, 1: on)
MG : memory color correction/green (0: off, 1: on)
MS : memory color correction/sky (0: off, 1: on)
MH : memory color correction/flesh color (0: off, 1: on)

| S | 16 | statisical data (stsdat) |

| T | 12 | trimming guide (trimgd) |

| OH | OV | TH | TV |
|----|----|----|----|
| L  | W  |    |    |

OH : horizontal offset
OV : vertical offset
TH : horizontal trimming (with codes)
TV : vertical trimming (with codes)
L  : length
W  : width

| B | 6 | border line |

| OH | OV | W |
|----|----|---|

OH : thorizontal offset
OV : vertical offset
W  : width

FIG.19

| B | 6 | border line |

| OH | OV | W |

OH : horizontal offset
OV : vertical offset
W  : width

| ⟩ | 9 | style of caption 1 (style1) |
| ) | 9 | style of caption 2 (style2) |

| offset | pos | pitch | size | R | G | B |

| – | – | – | – | I | A | P |

| ⟩ | 48 | text string of caption 1 (str1) |
| ) | 48 | text string of caption 2 (str2) |

FIG.20

[o:rles] release object host ←- printer

| param. ID | value length | contents |
|---|---|---|

| # | 2 | object number (obj#) |
|---|---|---|

| S | 2 | status (status) |
|---|---|---|

| 0 | normal termination |
|---|---|
| 1 | abnormal termination |
| 2 | termination due to suspension of page processing |

FIG.21

[d:dreq] data request                              host ←- printer

| param. ID | value length | contents |
|-----------|--------------|----------|
| # | 2 | object number (obj#) |
| L | 4 | requested length (reqlen) |

FIG.22

[o:dsnd] send data                                     host ←- printer

| param. ID | value length | contents |
|---|---|---|
| # | 2 | object number (obj#) |
| S | 2 | status (status) |

| 0 | normal |
|---|---|
| 1 | EOF |
| 2 | incorrect object number of data request |

| + | 4 | data length (dtlen) |

FIG.23

[o:seek] seek                                              host ⟵ printer

| param. ID | value length | contents |
|---|---|---|

| # | 2 | object number (obj#) |

| 0 | 2 | origin (origin) |

| 0 | top of data |
|---|---|
| 1 | current readout position |
| 2 | end of data |

| L | 4 | offset |

PRINTER FOR COMMUNICATING COMMANDS WITH HOST DEVICE AND METHOD OF CONTROLLING SAID PRINTER

BACKGROUND OF THE INVENTION

1. Field of the Invention

The present invention generally relates to printer technology, and particularly to technology of processing control based on a specific command system used for the communication between a host device and printer.

2. Description of the Related Art

In order for a host device, as typified by a PC, to make a printer print application data, the host device requires a printer driver (program for controlling the printer) prepared for each printer. Upon receiving application data from an application program, the printer driver converts such application data into print job data unique to the printer and outputs this to such printer. When the printer receives this application data, it interprets this and generates bit map data in a raster format and thereby realizes printing on printing paper.

Further, in a typical information processing system, electronic devices such as a printer, scanner, digital camera and so on are peripherally arranged with the host device in the center. The host device having built-in drivers (device drivers) unique to the respective electronic devices intermediates information with such electronic devices. For example, when printing image data stored in a digital camera, the host device initially reads the image data stored in this digital camera into the application program, converts this image data into print job data via the printer driver from the application data, and outputs this to the printer.

The program size of the printer driver is ordinarily several hundred K Bytes or more. Therefore, host devices such as computers having superior processing speed and abundant memory space will have no problems being provided with built-in printer drivers. Nevertheless, with small electronic devices such as a digital camera, for example, it is difficult to provide built-in printer drivers due to hardware restrictions and so forth.

Accordingly, an object of the present invention is to enable a host device to make a printer print document data in the host device without requiring conventional printer drivers.

Another object of the present invention is to provide a novel communication protocol between the host device and printer based on a specific command system.

SUMMARY OF THE INVENTION

The gist of the present invention is of a printer, which receives print setting information from a host device, initiatively requesting to the host device the print object data based on this print setting information, and printing the print object data sent from the host device in accordance with the request.

Another gist of this invention is of the host device making an inquiry on the print setting to the printer prior to sending print setting information to the printer and, by the printer sending to the host device a reply based on its characteristic information in response to the inquiry, preparing print setting information to be sent to the printer based on this reply.

A further gist of this invention is of a printer preparing second print setting information based on the characteristic information of the printer regarding the first print setting information sent from the host device, and printing the print object data sent from the host device based on the first print setting information and/or second print setting information.

Thereby, the printer is able to set the details of printing in accordance with its characteristic in response to the print setting information sent from the host device. Accordingly, the host device is no longer required to priorly store print setting information depending on a specific printer.

When the first print setting information designates printing based on a plurality of print object data, the printer respectively requests the plurality of print object data. Here, the printer specifies print object data in a prescribed order based on the first print setting information, and respectively requests the specific print object data.

The specification of print object data between the host device and printer is conducted in accordance with management information (object number). In other words, the host device sends an issuance request to the printer, and the printer issues management information in which the contents thereof are in accordance with its memory availability condition and notifies the management information to the host device which requested the issuance thereof. Typically, management information is the identification number(s) in which a printer is able to simultaneously manage print object data. The host device, while setting the details of printing for each print object data using such management information, also requests print object data to the host device using such management information.

When processing related to the printing of print object data sent from the host device, such as the generation of bit map data, is completed, the printer releases the management information of the completed print object data, and notifies the host device of the released management information. Thereby, the printer is able to issue new management information. The printer issues new management information when the processing related to printing is completed and when it has not yet issued the number of management information requested by the host device Even here, the printer issues new management information in which the contents thereof are in accordance with its condition. Accordingly, the printer repeats the issuance of management information until the issuance request is satisfied.

When the print setting information is designating the automatic arrangement of print object data, the printer divides a prescribed area of a print recording medium into prescribed partial areas, and requests print object data to be arranged within the divided prescribed partial areas to the host device based on the print setting information. Preferably, the prescribed partial areas are typically in a rectangular shape. Moreover, when the print setting information is designating the number of divisions, the printer divides the prescribed area into prescribed partial areas in accordance with such designated number of divisions. Further, when the print setting information is designating a margin value, the printer determines the arrangement area of the print object data to be arranged within the prescribed partial areas in accordance with such margin value. Thereby, the host device is able to print in the arrangement format prepared by the printer without having to particularly designate the arrangement of the print object data.

The printer respectively requests the plurality of print object data to be arranged in the partial areas belonging to prescribed band areas in the prescribed print area. In other words, the plurality of print object data is requested in a raster order to the prescribed print area. The printer generates prescribed band-area worth of bit map data based on the print object data sent from the host device.

The printer requests the print object data upon receiving the information relating to the print setting termination from the host device. Further, the printer suspends the printing processing upon receiving print suspension information from the host device while performing the processing for printing the print object data.

Typically, the present invention is realized with a program interpreted and executed by a processor. That is, the processor executes the program, and by cooperation with other hardware, functions of the present invention are realized.

BRIEF DESCRIPTION OF THE DRAWINGS

FIG. 5 is a diagram for explaining the print quality setting command;

FIG. 6 is a diagram for explaining the print quality setting command;

FIG. 7 is a diagram for explaining the user-defined LUT setting command;

FIG. 8 is a diagram for explaining the page availability inquiry command;

FIG. 9 is a diagram for explaining the page availability reply command;

FIG. 10 is a diagram for explaining the page format defining command;

FIG. 11 is a diagram for explaining the page processing termination command;

FIG. 12 is a diagram for explaining the object number request command;

FIG. 13 is a diagram for explaining the page setting termination command;

FIG. 14 is a diagram for explaining the page processing termination command;

FIG. 15 is a diagram for explaining the object number issuance command;

FIG. 16 is a diagram for explaining the image object setting command;

FIG. 17 is a diagram for explaining the image object setting command;

FIG. 18 is a diagram for explaining the image object setting command;

FIG. 19 is a diagram for explaining the image object setting command;

FIG. 20 is a diagram for explaining the object release command;

FIG. 21 is a diagram for explaining the data request command;

FIG. 22 is a diagram for explaining the data transmission command;

FIG. 23 is a diagram for explaining the data readout-position alteration command;

DESCRIPTION OF THE PREFERRED EMBODIMENTS

Next, the embodiments of the present invention are explained with reference to the drawings.

1 Structure 1-1 Structure of Print System

Figure 1:
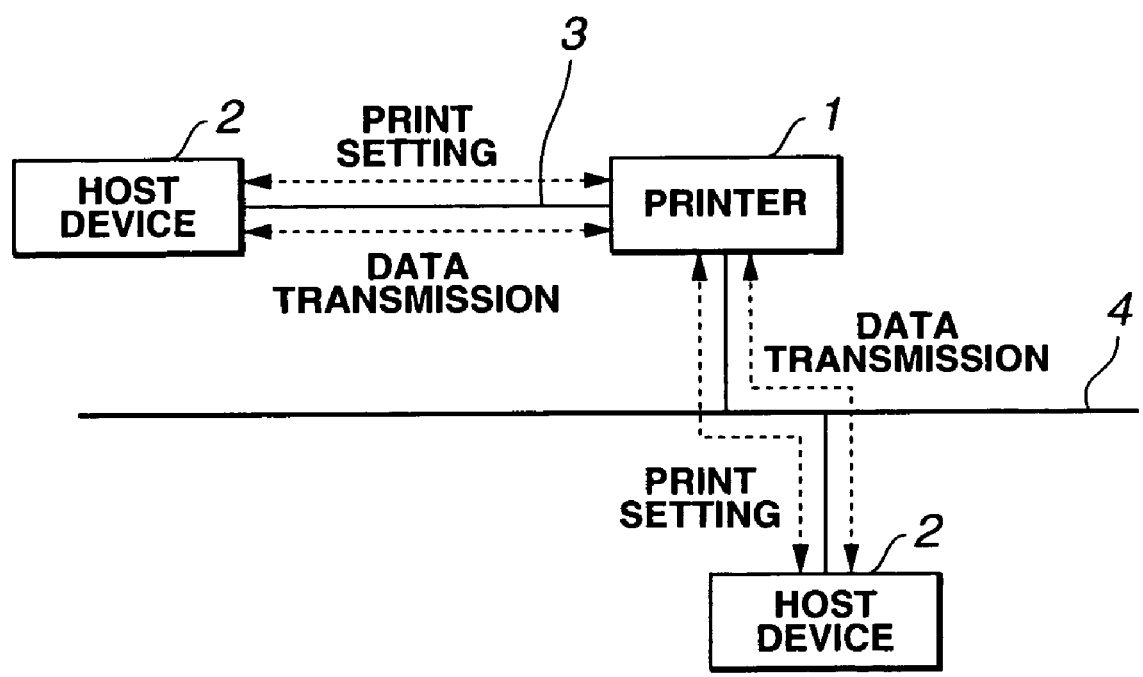
FIG. 1 is a diagram showing the schematic structure of the print system.

FIG. 1 is a diagram showing the structure of the print system according to the present embodiment. As shown in FIG. 1, the printer 1 is locally connected to a host device 2 via a dedicated line 3 such as a parallel cable, and is network connected to the host device 2 via a network 4 such as a LAN. The host device 2 may be typically replaced with electronic devices such as a digital camera or scanner, but may also be a general purpose PC. Explained below is an example of a print system wherein the printer 1 and the digital camera; i.e., host device 2, are connected to the network 4.

1-2 Structure of Printer

Figure 2:
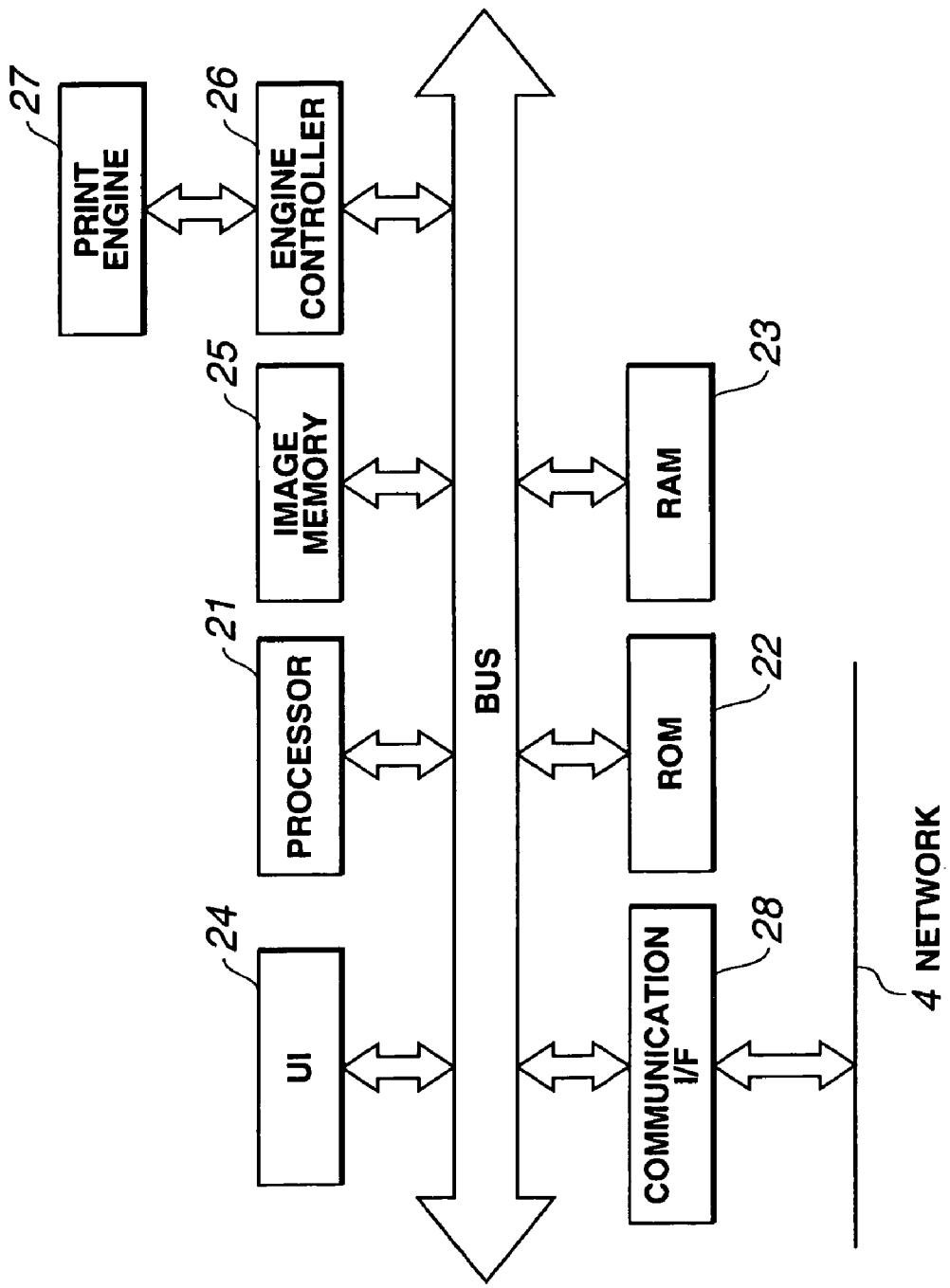
FIG. 2 is a diagram showing the hardware structure of the printer.

FIG. 2 is a diagram showing the hardware structure of the printer 1. As shown in FIG. 2, the printer 1 comprises a processor 21, ROM 22, RAM 23, user interface 24, image memory 25, engine controller 26, print engine 27, and communication interface ("communication I/F") 28. The processor 21 makes the printer 1 realize prescribed functions by executing a program stored in the ROM 22 and cooperating with other hardware. For example, as described later, the processor 21 interprets commands sent from the host device and executes various processing in accordance with such commands. Typically, the processor 21 converts the print object data sent from the host device 2 into bit map data in a raster format, and outputs this to the image memory 25. The ROM 22, in addition to storing the aforementioned program, stores prescribed data such as font data and LUT. The RAM 23 functions as the main storage device of the processor 21. The user interface 24, for example, is structured of a display panel and operational buttons for conducting various print settings, and enables interactive operation by the user. The image memory 25 stores bit map data required for printing in prescribed band quantity units. The engine controller 26 supplies bit map data stored in the image memory 25 to the print engine 27. The print engine 27, for example, is structured from a paper-feeding mechanism or printing head, and conducts printing on print recording media such as paper. The print engine 27 may be selected in accordance with the type of printer; for example, laser printers, serial printers, and so on. The communication I/F 28 is physically connected to the network 4 and enables the network communication with the host device 2.

Figure 3:
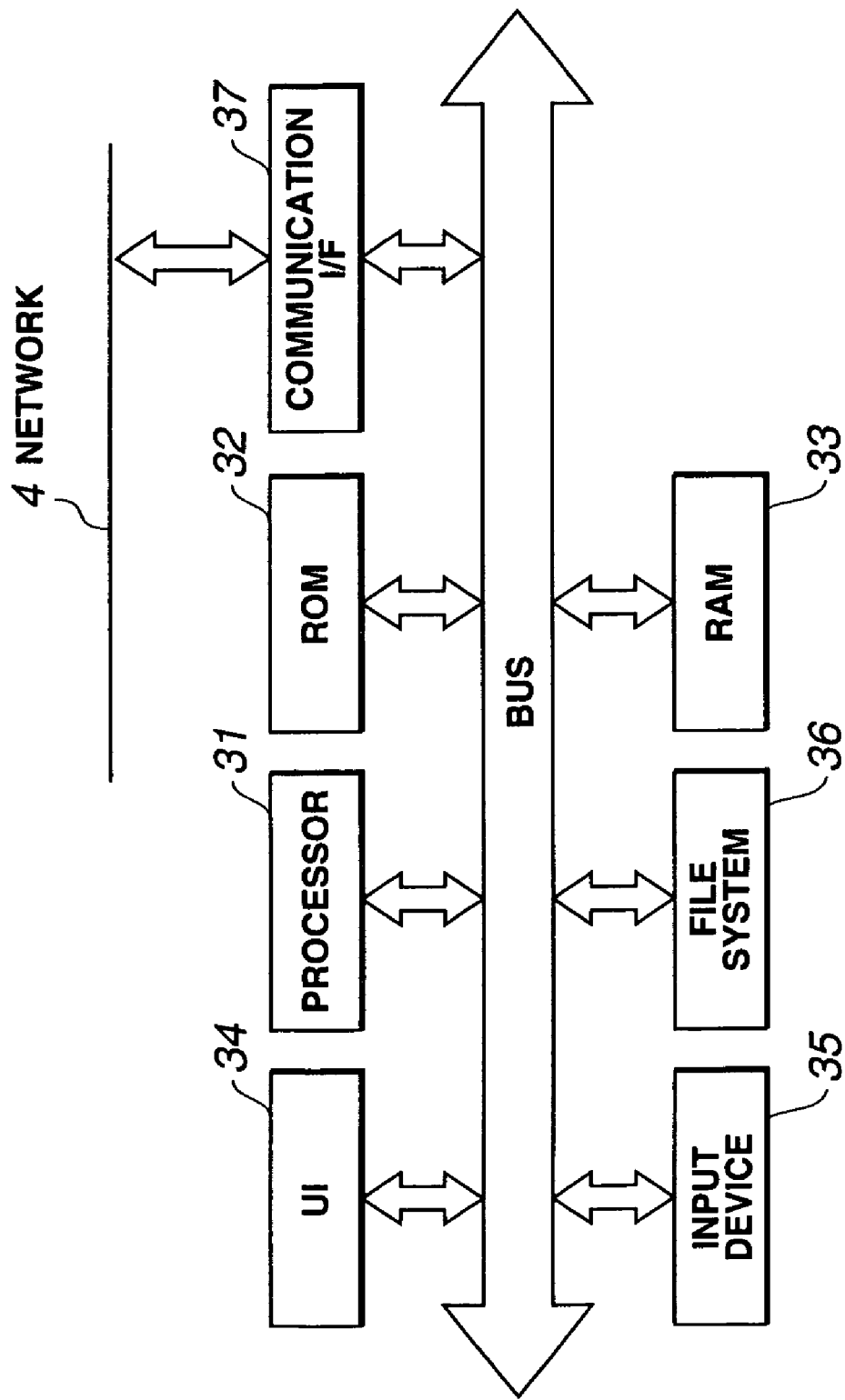
FIG. 3 is a diagram showing the hardware structure of the host device.

FIG. 3 is a diagram showing the hardware structure of the host device 2. As shown in FIG. 3, the host device 2 comprises a processor 31, ROM 32, RAM 33, user interface 34, input device 35, file system 36, communication I/F 37, and these are all mutually connected via an internal bus. The processor 31 controls the overall operation of the host device 2 in accordance with the program stored in the ROM 32. The RAM 33 functions as the main storage device of the processor 31. If, for example, the user interface 34 is a digital camera, it will be structured of a display panel and operational buttons and will enable interactive operation by users. The input device 35 inputs image data obtained from images filmed with a CCD to the internal bus in accordance with filming instructions of the user provided from the user interface 34. The file system 36, for example, is a so-called external storage device structured from the likes of a flash memory or hard disk, and stores image data read by the input device 35 in a prescribed format. The communication I/F 37 is physically connected to the network 4, and enables the network communication with the printer 1.

2 Explanation of Commands

In the print system of this embodiment, the host device and printer 1 communicate with a prescribed command system and advance the series of print processing steps. Commands defined under the print system of this embodiment are now explained.

2-1 Outline of Commands

Figure 4A:
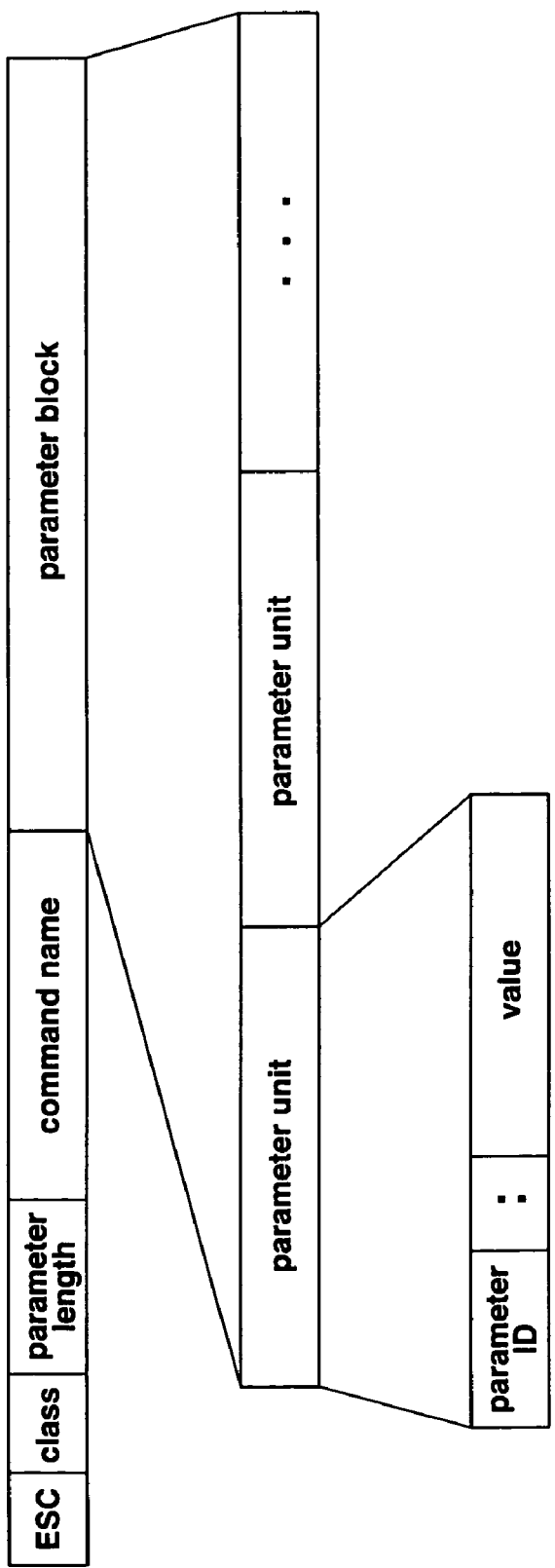
FIG. 4 is a diagram for explaining the outline of a command.

FIG. 4 is a diagram for explaining the outline of command data used in the print system of this embodiment. As shown in FIG. 4, the command data in this embodiment is structured in data rows of variable lengths. The respective areas in FIG. 4 are now explained.

ESC: top marker of byte row (control code "ESC", 1 Bh)

class: ASCII code of 1 byte representing the classification of commands class is classified as follows:
- d: data
- m: model dependent
- o: object
- p: page parameter length: length of parameter block (bytes)

command name: character row of 4 bytes representing a command name; identifies the command in combination with the class parameter block: structured from an arbitrary number of parameter units parameter unit: parameter ID of 1 byte showing the type of parameter; structured from the punctuation ":" and value A command prescribes the value size of the respective parameters. Further, upon using a numerical value of 2 bytes or more as the parameter value, unless otherwise set forth in the definitions of the respective commands, such value shall be a big-endian.

Figure 4B:

Moreover, if a parameter in the format shown in FIG. 4(b) is included in the parameter block, binary data having the number of bytes shown in "data length" follows the parameter block. The size of this binary data does not include "parameter length."

In the following explanation, a command is expressed in the format of "[class:command name] ". For example, in [p:make], the class is "p" and the command name is "make".

2-2 Explanation of the Respective Commands (1) [m:qlty] set printing quality (FIGS. 5 and 6)

This command is sent from the host device 2 to the printer 1. This command is for setting the printing conditions. The contents of the parameter will differ with a case where a printer is specified and the host device is aware of the characteristic information of the printer model, and a case where the setting is to be made without depending on the printer model.

M: Designates the media quality. The settable value range and the type of compatible paper will differ in accordance with the printer model.

Q: Designates the printing quality in 16 levels.

P, T: Parameters designating the color correction of photograph image objects and text/graph image objects are respectively sent in that order. The respective parameters are coded 1 byte parameters having a range of −50~+50. When a value smaller than −50 is designated, it will be treated as −50 having been designated. When a value larger than +50 is designated, it will be treated as +50 having been designated.

B: Designates color printing or black and white printing.

W: Designates the on/off of microwave printing. The range in which the expandable microwave may be designated and the type of compatible microwave will depend on the printer model.

D: Designates the mode of printing direction control.

H: Designates the type of halftone processing.

Z: Designates the dot size. The settable value range and the compatible dot size will depend on the printer model.

H, T: Designates the print resolution in the horizontal and vertical directions in dpi (dot per inch). The settable value range and the default value will depend on the printer model. Further, if only the horizontal resolution or vertical resolution is designated, both values will be default values.

L: Designates ID of the user-defined LUT set at [m:slut] as the reference table for color conversion. The settable range will depend on the printer model. Moreover, when lut-id is not designated, the printer 1 makes a judgment in accordance with the type of paper or printing quality and uses the LUT built in the printer.

(2) [m:slut] Set User-Defined LUT (FIG. 7)

This command is sent from the host device to the printer 1. This command is for setting the user-defined LUT to the printer as the LUT to be used for color conversion.

I. Designates the ID number of LUT. The settable ID number range and the type of LUT storage compatible with such ID number will depend on the printer model. When an incompatible ID number is designated, this command will be disregarded.

+: Shows the length of LUT data.

The binary data of dtlen bytes succeeding this command will be treated as LUT data. The LUT data format will depend on the printer model.

(3) [p:inqa] Inquire Page Availability (FIG. 8)

This command is sent from the host device 2 to the printer 1. This command is for requesting to the printer 1 a reply on the settable range of the page printing area and the arrangement thereof. The printer 1 replies to this command with a [p:rpla] command.

D: The denominator to be sued for replying to the inquiry is designated. When a denominator is not designated, a prescribed value of the printer will be used.

(4) [p:rpla] Reply Page Availability (FIG. 9)

This command is sent from the printer 1 to the host device 2. This command is for replying the settable range of the page printing area in response to the inquiry of the [p: inqa] command.

D: Represents the denominators of the respective parameters below with values designated with the [p:inqa] command. However, a reply is made using a predetermined value of the printer if the denominator value upon using the value designated with the [p:inqa] command exceeds 4 bytes, or when 0 is designated with the [p:inqa] command, or when denomi is not designated with the [p:inqa] command.

W, H: Shows the maximum width and maximum height of the settable page printing area.

maximum width: width/denomi (inch)

maximum height: height/denomi (inch)

When the maximum width and maximum height are not an integral number, a reply is provided upon omitting fractions.

T: Shows the settable minimum value of the distance (top margin) from the top end of the paper to the top end of the page printing area.

minimum value of top margin=*tmrgin/denomi* (inch)

When the maximum value of the top margin is not an integral number, a reply is provided upon omitting fractions.

L: Shows the distance (left margin) from the left end of the paper to the horizontal commencement position of the page printing area.

left margin:=*lmrgin/denomi* (inch)

When the left margin is not an integral number, a reply is provided upon omitting fractions.

R: Shows the minimum distance (minimum value of right margin) required from the right end of the paper to the right end of the page printing area. When processing is conducted such that the distance from the right end of the paper to the right end of the page printing area falls below the minimum value of the right margin upon setting the page printing area, such processing will depend on the printer model.

minimum value of right margin=*rmrgin/denomi* (inch)

When the minimum value of the right margin is not an integral number, a reply is provided upon omitting fractions.

B: Shows the minimum distance (minimum value of bottom margin) required from the bottom end of the paper to the bottom end of the page printing area. When processing is conducted such that the distance from the bottom end of the paper to the bottom end of the page printing area falls below the minimum value of the bottom margin upon setting the page printing area, such processing will depend on the printer model.

minimum value of bottom margin=*bmrgin/denomi* (inch)

When the minimum value of the bottom margin is not an integral number, a reply is provided upon omitting fractions.

(5) [p:make] Make Page (FIG. 10)

This command is sent from the host device 2 to the printer 1. This command is for setting the size of the page printing region and designating the method of arranging the print object. The host device 2 divides the page printing area into a checkered shape and designates either the "automatic arrangement" for arranging the print object in the respective cells, or "individual arrangement" for designating the position per print object. In the case of "automatic arrangement," the host device 2 designates how many partitions the page printing area is to be divided into in the horizontal direction and vertical direction, respectively.

D: Represents the denominators of the respective parameters below.

W, H: Designates the width and height of the page printing area.

width=width/*denomi* (inch)

height=height/*denomi* (inch)

When the width and/or height exceeding the maximum value is designated, it is treated as the maximum width and/or height having been designated. When denomi is not designated or when 0 is designated, the width and height are treated as the number of dots in the resolution designated with the [m:qlty] command.

T: Designates the distance (top margin) from the top end of the paper to the top end of the page printing area.

top margin=*tmrgin/denomi* (inch)

When the top margin less than the maximum value is designated, the printer 1 treated this as the minimum value having been designated. When denomi is not designated or when is designated, tmrgin is treated as the number of dots in the resolution designated with the [m:qlty] command.

A: Designates the method of arranging print objects. Further, in the case of "perpendicular serial arrangement," image data is transmitted with one-way communication.

H, V: Designates the number of divisions in the horizontal direction and vertical direction. When the number of divisions is not set or when 0 is set, it will not be an "automatic arrangement." When the method of arranging the print objects is other than "automatic arrangement," these parameters are disregarded.

(6) [p:proc] Proceed

This command is sent from the host device 2 to the printer 1. This command is for instructing the printer 1 to execute printing of the image object previously set.

(7) [p:fini] Page Finished (FIG. 11)

This command is sent from the host device 2 to the printer 1. This command is for notifying the termination of the development processing with respect to the print information set with the [p:endp] command.

(8) [o:req#] Request Object Numbers (FIG. 12)

This command is sent from the host device 2 to the printer 1. This command is for requesting to the printer the issuance of "object numbers" to be used upon setting the print objects. The printer 1 issues object numbers with the [o:iss#] command once, or a plurality of times until reaching the number of requests made in this command.

(9) [p:endp] End of Page (FIG. 13)

This command is sent from the host device 2 to the printer 1. This command is for notifying the termination of one page worth of print information setting. Upon receiving this command, if the number of object numbers requested with the [o:req#] command has not been issued with the [o:iss#] command, the remaining object numbers will not be issued. Moreover, despite the object numbers being issued by the printer with the [o:iss#] command, if there are object numbers not used in the [o:make] command, such object numbers will be invalid.

(10) [p:term] Terminate Page (FIG. 14)

This command is sent from the host device 2 to the printer 1. This command is for suspending the processing of the pages being printed. The printer 1 performs suspension processing for all print objects under processing, and notifies the host device 2 of the processing termination with the [o:rles] command regarding the respective print objects. After the suspension processing for all print objects is completed, the printer 1 notifies the host device 2 of the completion of the page processing suspension with the [p:fini] command. Moreover, despite the object numbers being issued by the printer 1 with the [o:iss#] command, if there are object numbers not used in the [o:make] command, such object numbers will be invalid.

(11) [o:iss#] Issue Object Numbers (FIG. 15)

This command is sent from the printer 1 to the host device 2. This command is for issuing usable object numbers in response to the [o:req#] command.

N: Shows the number of object numbers to be issued with this command.

+: Shows the object number usable by the host device 2 for setting the print object. When simultaneously issuing a plurality of object number, object numbers having different numbers shown in (nobj#) will continue.

(12) [o:mkim] Make Image Object (FIGS. 16 to 19)

This command is sent from the host device 2 to the printer 1. This command is for setting the print objects. This command will be invalid if the page format is not designated with the [p:make] command.

+: Selects and designates one object number issued with the [o:iss#] command. Thereafter, the exchange of information or image data relating to the pertinent print object to be conducted between the host device 2 and printer 1 will be based on the utilization of such object number. This command will be invalid in the following cases:
  (i) The object number is not designated;
  (ii) An object number other than the object numbers issued with the [o:iss#] command is designated; or
  (iii) An object number previously set with the [o:mkim] command is designated.

D: Represents the denominators of the following parameters.

X, Y: Designates the upper left position of the object developmental area with the origin being the upper left corner of the page printing area.

horizontal position=(xpos)/(*denomi*) (inch)

vertical position=(ypos)/(*denomi*) (inch)

When denomi is not designated or when 0 is designated, xpos and ypos are treated as the number of dots in the resolution designated with the [m:qlty] command. Moreover, when a position other than the page printing area is designated, the object is not printed, and an error is notified with the [o:rles] command. Here, the object number may not be used until it is reissued with the [o:iss#] command.

Further, when automatic arrangement is designated with the [p:make] command, these parameters are disregarded.

W, H: Designates the width and height of the object developmental area.

width=(width)/(*denomi*) (inch)

height=(height)/(*denomi*) (inch)

When denomi is not designated or when 0 is designated, the width and height are treated as the number of dots in the resolution designated with the [m:qlty] command. Moreover, when a width or height exceeding the page printing area is designated, the object is not printed, and an error is notified with the [o:rles] command. Here, the object number may not be used until it is reissued with the [o:iss#] command.

Further, when automatic arrangement is designated with the [p:make] command, these parameters are disregarded.

R: Designates the rotational direction of the image. When "4" or "5" is designated, the printer 1 decides the rotational direction in accordance with its capacity.

F: Designates the size adjustment method when the aspect ratio of the object developmental area and image data is different.

When "0", image data is printed such that it will appear on the page space in its entirety. There will be a margin at the left/right or top/bottom of the object developmental area. The aspect ratio of the image is stored.

When "1", printing is conducted such that the object developmental area is filled up in its entirety. The left/right or top/bottom of the image will be cut off. The aspect ratio of the image is stored.

When "2", the aspect ratio of the image is changed such that the image data is printed to fit the object developmental area exactly.

A: When "0" or "1" is designated with the size fitting, the arrangement of top/bottom and left/right is designated.

Q: In order to accelerate the developmental processing of the image, if possible, the compression of image data upon development thereof is designated. As data of a low resolution will be used, the printing quality will lower. Further, the algorithm designated with the TBD will not be used for theresize, and used will be the fastest resize algorithm.

I: Designates the classification of the image for performing appropriate color conversion processing. However, when the image data is in a format containing indent information, designations with intent are disregarded.

Z: Designates the image data size in bytes. When the printer 1 has a sufficient memory area, it may be possible to perform high-speed developmental processing (especially when rotating the image) by buffering the image data. When the dtsize is not designated, buffering of the image data will not be conducted even if the printer has a sufficient memory area.

P: Designates the setting of APF (Auto Photo Fine). APF is a processing for adjusting the picture quality. The upper byte designates the application of APF and the lower byte designates the application of APF items. When the upper byte is "1", image data is pre-scanned prior to printing, and items designated with the lower bytes are amended. When the upper byte is "2", a simplified APF is applied based on the image statistical value sent with the parameter (statistical data). The simplified APF conducts contrast emphasis, brightness emphasis, and sharpness. Here, the image data is not pre-scanned. Moreover, when there is no parameter of statistical data, the simplified APF will not be applied. When the upper byte is "0" or "1", the lower byte is disregarded.

S: Sends the statistical data of the image data to be applied to the simplified APF in order. Statistical data is composed of amaximumvalue (YMAX, RMAX, GMAX, BMAX), minimumvalue (Ymin, Rmin, Gmin, Bmin), standard deviation value (YSTD, RSTD, GSTD, BSTD), and average value (YAVR, RAVR, GAVR, BAVR). Here, Y is the brightness represented by 1 byte, as shown in the following formula:

$$Y=(38\times R+76\times G+14\times B)/128$$

Moreover, the respective colors of RGB are represented with 8 bits.

T: Designates the drawing of the cutting guideline. when simultaneously designated with the drawing of the framework, the drawing designation of the framework will be invalid. The respective values are designated with denomi as the denominator. For example:

horizontal offset=$OH/denomi$ (inch)

When denomi is not designated or when 0 is designated, the value will be treated as the number of dots in the degree of resolution designated with the [m:qlty] command.

B: Designates the drawing of the framework. However, when the drawing of the cutting guideline is designated, the drawing designation of the framework will be invalid. The respective values are designated with denomi as the denominator. For example:

horizontal offset=$OH/denomi$ (inch)

When denomi is not designated or when 0 is designated, the value will be treated as the number of dots in the degree of resolution designated with the [m:qlty] command.

">" and ")" designate the position, size and color of the image caption. When there is no designation, a caption is not printed.

offset: Designates the distance from the end of the object developmental area.

distance=offset/$denomi$ (inch)

When denomi is not designated or when 0 is designated, the value will be treated as the number of dots in the degree of resolution designated with the [m:qlty] command.

pos: Designates the position and direction of the characters.

P: Position to image (0: top, 1: bottom, 2: right, 3: left)

A: Arrangement (0: left end, 1: center, 2: right end)

I: Direction of characters (0: normal position, 1: reverse)

pitch: Designates the character pitch.

size: Designates the character size.

R,G,B: Designates the color of the text with RGB in 8 bits, respectively.

<, (: Designates the character rows of the caption with the ASCII code. Upon using character rows shorter than this, unnecessary portions are filled with ヌル characters.

(13) [o:rles] Release Object (FIG. 20)

This command is sent from the printer 1 to the host device 2. This command is for notifying the termination of the print object processing.

: Shows the object number of the processed print object.

S: Shows the state of processing termination.

(14) [d:dreg] Data Request (FIG. 21)

This command is sent from the printer 1 to the host device 2. This command is for requesting to the host device 2 data (i.e. image data) of the print object.

: Designates the object number of the print object in which the data is requested.

L: Designates the requested data length.

When the host device 2 receives this command, it sends a [d:dsnd] command in accordance with the number of bytes requesting the data of the pertinent print object. Further, when the host device 2 is not able to transmit the data, an error is notified with the [d:dsnd] command.

(15) [d:dsnd] Send Data (FIG. 22)

This command is sent from the host device 2 to the printer 1. This command is for transmitting the requested image data to the printer 1 with the [d:dreq] command.

: Designates the object number of the print object in which the data is transmitted.

S: Shows the transmission information of the image data.

+: Shows the transmitted data length. When the status is "1" or "2" and data cannot be transmitted, dtlen is set to 0.

The binary data of the dtlen byte succeeding this command will be treated as the image data.

(16) [d:seek] Seek (FIG. 23)

This command is sent from the printer 1 to the host device 2. This command is for requesting to the host device the change of the data readout position of the print object.

: Designates the object number of the print object in which the data readout position is to be changed.

O: Shows the standard readout position designation.

L: Shows the distance from the origin to the data readout position in coded bytes.

When the host device 2 receives this command after receiving the [d:dreq] command and before sending the requested data to the printer with the [d:dsnd] command, it changes the readout position after receiving the requested data.

3 Functional Structure 3-1 Functional Structure of the Printer

Figure 24:
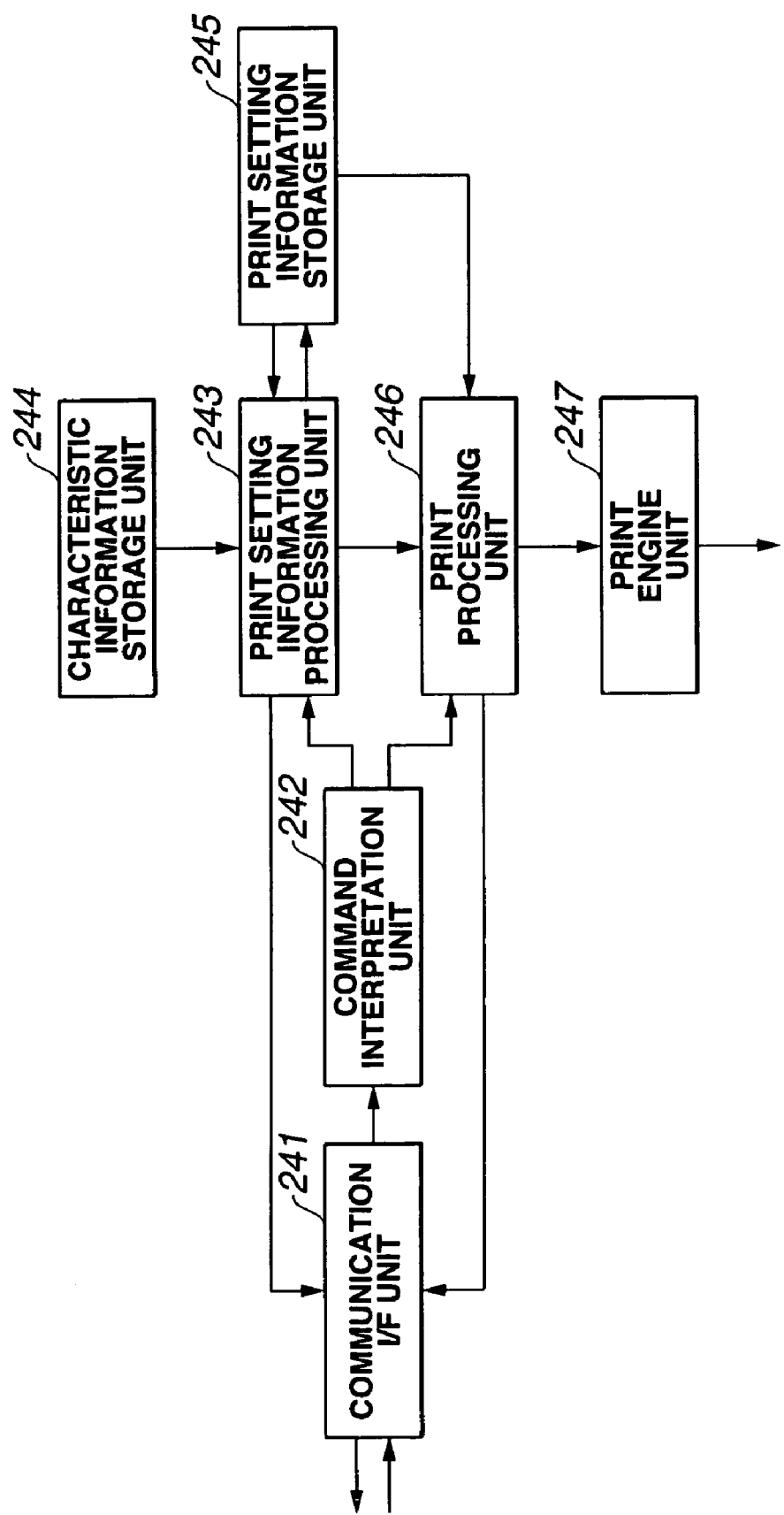
FIG. 24 is a block diagram showing the functional structure of the printer.

FIG. 24 is a block diagram showing the functional structure of the printer 1. In other words, FIG. 24 functionally represents the printer 1 shown in FIG. 2. As shown therein, the printer 1 comprises a communication I/F unit 241, command interpretation unit 242, print setting processing unit 243, characteristic information storage unit 244, setting information storage unit 245, print processing unit 246, and print engine unit 247.

When the command interpreter 242 receives command data from the host device 2 via the communication I/F unit 241 (corresponds to the communication I/F 28 shown in FIG. 2), it interprets the command containing this command, and controls the flow such that processing is performed in accordance with the interpretation results. The print setting processing unit 243 advances the processing relating to the print setting between the host device 2 by communication based on a defined command system. Details of the print setting processing unit 243 will be described later. The characteristic information storage unit 244 stores information relating to its specification ("characteristic information"). Characteristic information, for example, is a value set forth for each printer model regarding the likes of compatible resolution degree, compatible paper size, range of page availability, and so on. The print setting information storage unit 245 stores print setting information set by the print setting processing unit 243 based on the print setting request sent from the host device 2. The print processing unit 246 develops the print object data sent from the host device 2 via the command interpretation unit 242 into bit map data in a raster format based on the print setting information stored in the print setting information storage unit 245, and outputs this to the print engine unit 247 (corresponds to the print engine 27 shown in FIG. 2). Details of the print processing unit 246 are described later.

Figure 25:
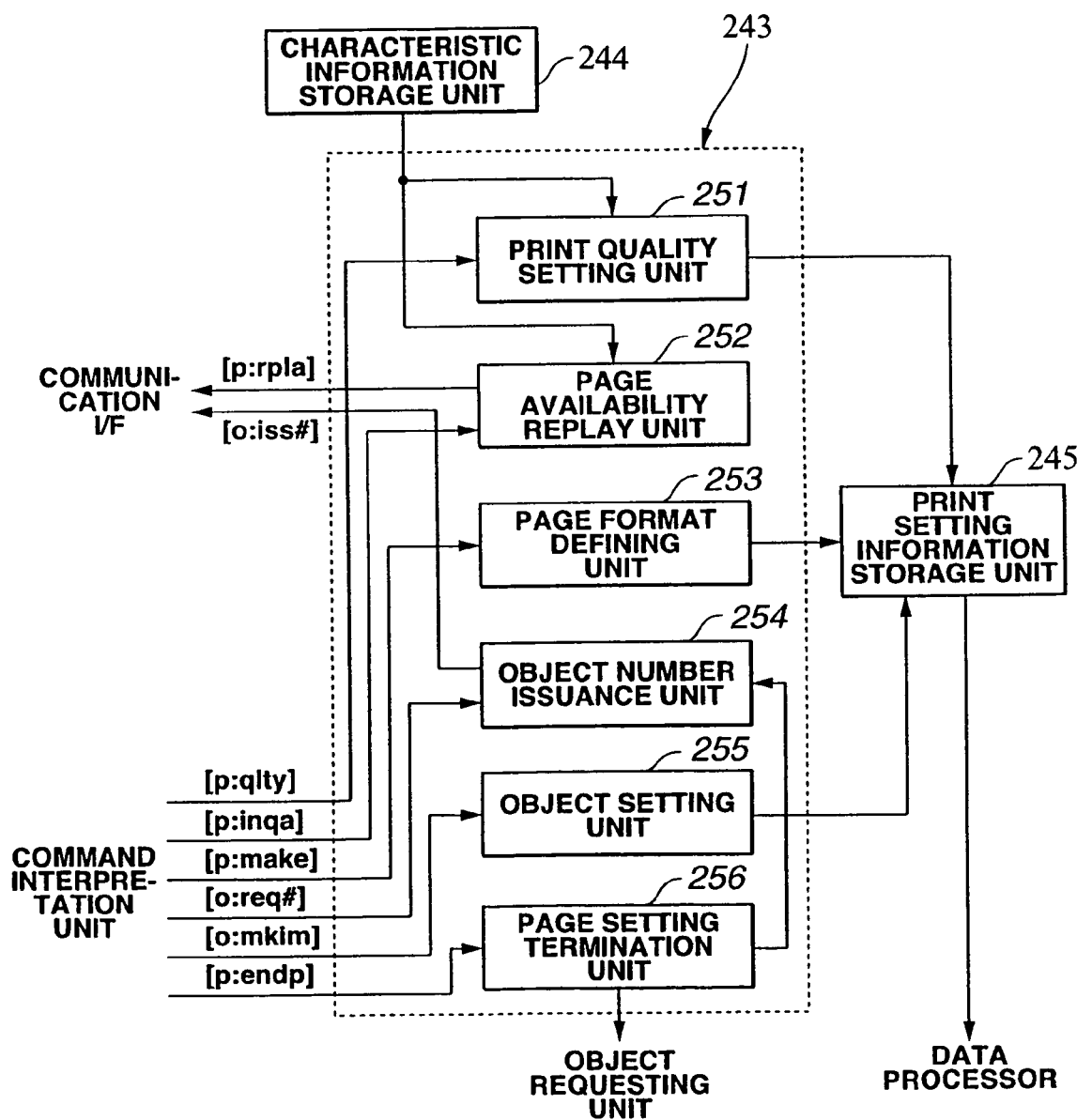
FIG. 25 is a block diagram showing the functional structure of the print setting processor.

FIG. 25 is a block diagram showing the functional structure of the print setting processing unit 243. In FIG. 25, the print quality setting unit 251 processes the command data ([m:qlty] command) related to the print quality setting. The print quality setting unit 251 prepares print setting information in accordance with the contents of the parameter unit contained in the command data and by referring to the characteristic information stored in the characteristic information storage unit 244, and outputs this to the print setting information storage unit 245. That is, the contents of the parameter unit designated by the host device 2 is not unconditional, and may be converted so as to fit the specification of the printer 1 and output as print setting information. For example, in the parameter "Q" for designating the picture quality, an absolute value such as 1200 dpi or 600 dpi is not designated, and relative values in 16 levels are designated. Therefore, when the value "15" implying the highest picture quality is designated, the picture quality will be set to 1200 dpi with a printer compatible up to 1200 dpi, and the picture quality will be set to 600 dpi with a printer compatible up to 600 dpi.

The page availability reply unit 252 processes the command data ([p:inqa] command) relating to the inquiry on the range of page availability. When the page availability reply unit 252 receives this command data, it refers to the characteristic information stored in the characteristic information storage unit 244, and prepares the command data (command data relating to the reply on the range of page availability ([p:rpla])) for replying on the range of the settable page printing area. The prepared command data is sent to the host device via the communication I/F unit 241. Moreover, when coefficient "D" is designated with the parameter unit of this command data, the page availability reply unit 252 provides a reply on the range of the settable page printing area based on such coefficient.

The page format defining unit 253 processes the command data ([p:make]) for defining the page format. The page format defining unit 253 prepares print setting information relating to the page format; for example, size of the page printing area and the method of arranging the print object, etc., in accordance with the contents of the parameter unit contained in this command data, and outputs this to the print setting information storage unit 245.

Figure 31:
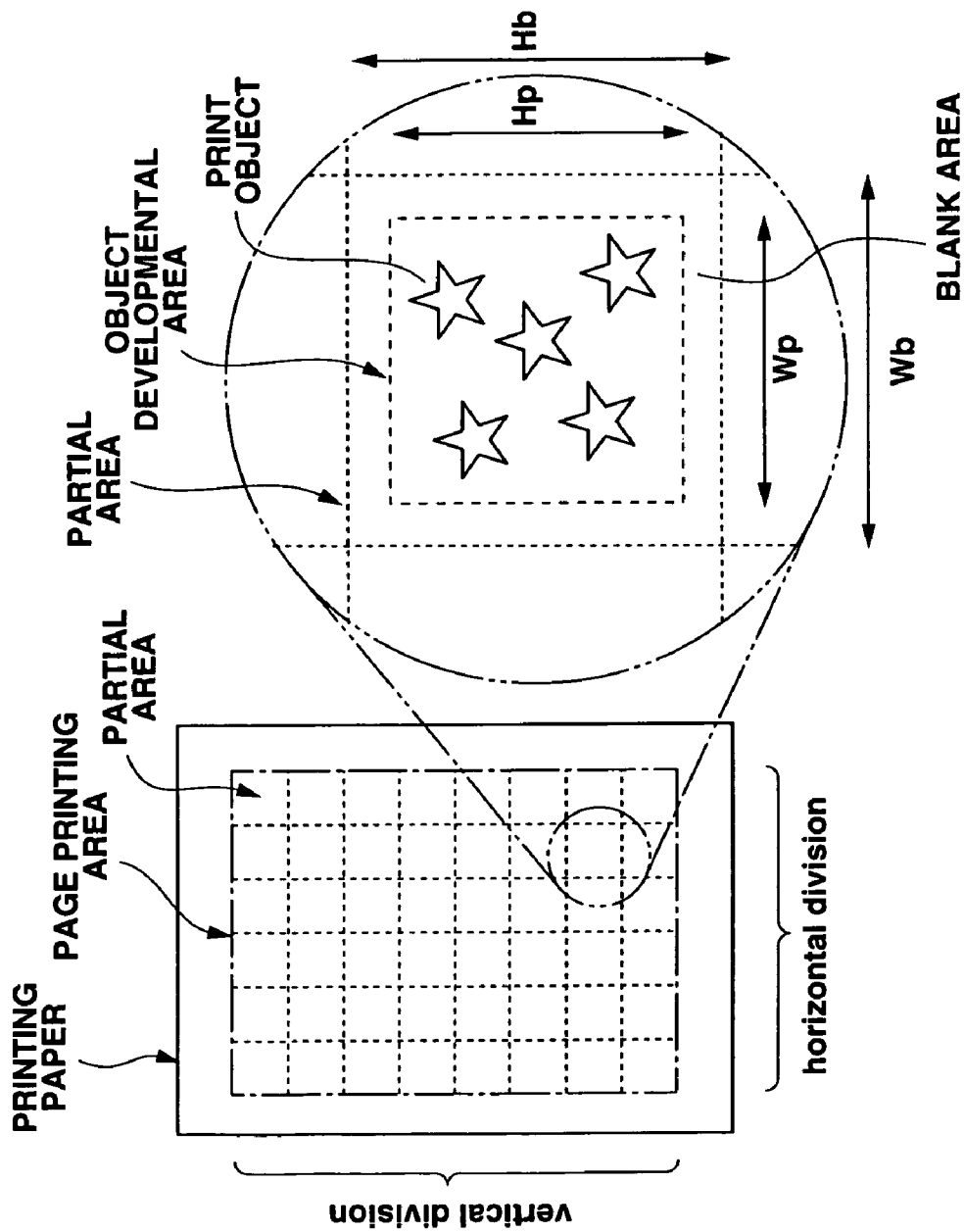
FIG. 31 is a diagram for explaining the automatic arrangement of the print object.

Specifically, the page format defining unit 253 sets the width and height of the page printing area (length in the main scanning line direction and the sub-scanning line direction) in accordance with the value designated with parameter "W" and "H" relating to the printing area. Further, the page format defining unit 253 sets the distance from the top end of the paper to the top end of the page printing area in accordance with the value designated with parameter "T". Further, when automatic arrangement is designated with parameter "A" relating to the print object arrangement, as shown in FIG. 31, the page format defining unit 253 divides the aforementioned set page printing area into partial areas for respectively arranging the print object data. It is preferable that each of these partial areas is a rectangle. Here, the page format defining unit 253 sets the rectangular partial areas by dividing the printing area into rectangles in accordance with parameter "H" and "V" relating to the number of divisions. When hpadd and vpadd are designated with parameter "X" and "Y" relating to the margin, the page format defining unit 253 determines the object developmental area (arrangement area) as follows:

$$hpadd=(Wb-Wp)/Wb\times100$$

$$vpadd=(Hb-Hp)/Hb\times100$$

The page format defining unit 253 assigns print objects to such partial areas of the object developmental area in accordance with prescribed conditions. For example, the page format defining unit 253 may assign print objects in a raster order from the upper left partial area to the lower right partial area in order from the smallest object number. Moreover, the host device may designate the partial areas and assign print objects thereto.

The object number issuance unit 254 processes command data ([o:req#]) relating to the issuance request of object numbers. Object numbers are for individually managing the print objects. The object number issuance unit 254 prepares command data (command data relating to the issuance request of object numbers ([o:iss"] command)) for replying object numbers in a number which it can manage simultaneously in response to the number of object numbers (number of objects requested) designated with the parameter unit. The prepared command data is sent to the host device 2 via the communication I/F unit 241.

Figure 32:
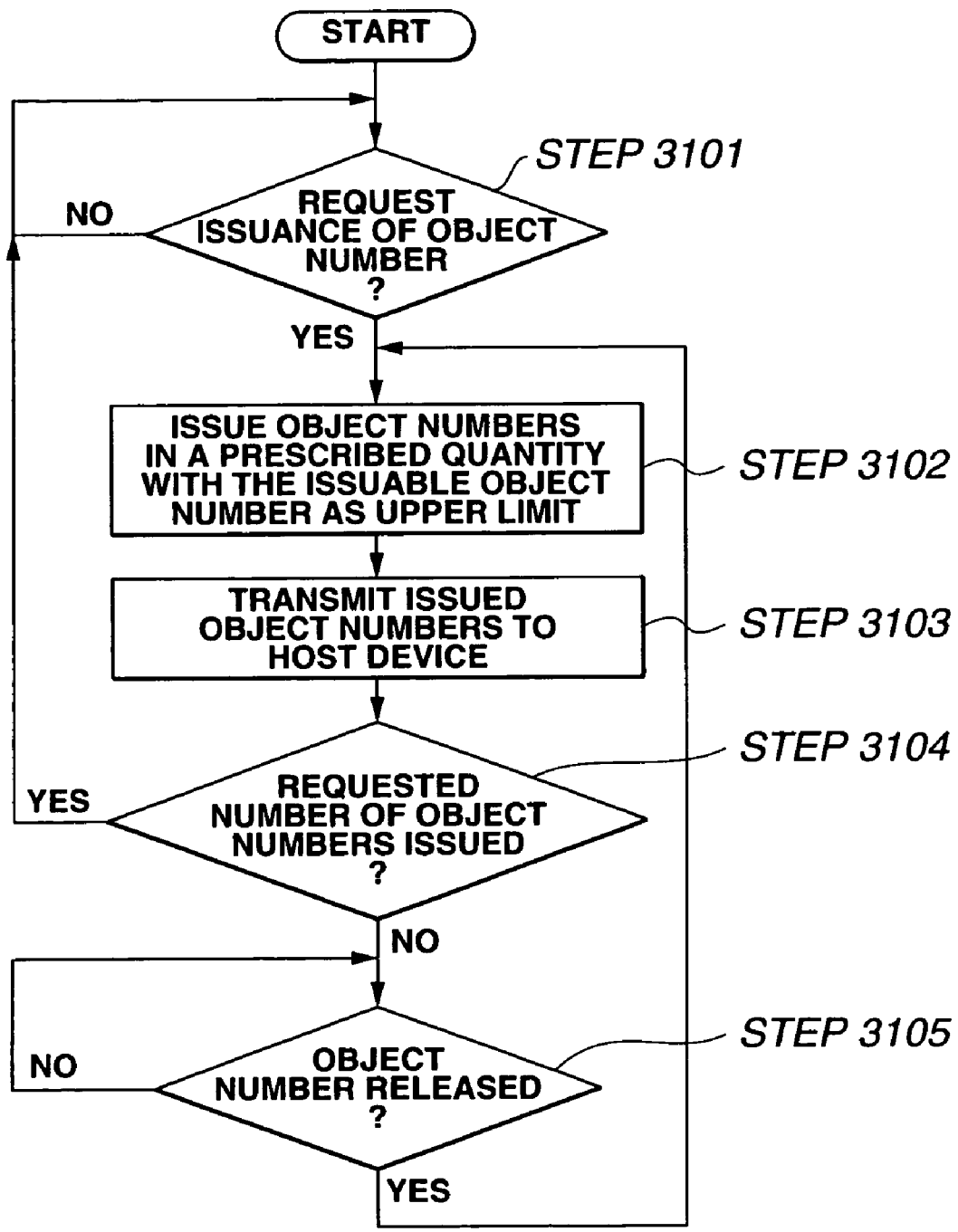
FIG. 32 is a flowchart for explaining the operation of the object number issuance unit.

FIG. 32 is a flowchart for explaining the processing of the object number issuance unit 254. As shown in FIG. 31, the object number issuance unit 254 stands by until it receives command data relating to the issuance request of object numbers from the host device 2 (STEP 3 101). Upon receiving the command data, the object number issuance unit 254 issues a prescribed number of object numbers with the upper limit being the number which it can simultaneously manage (STEP 3102), and outputs this to the host device 2 (STEP 3103). The object number issuance unit 254 judges whether the requested number of object numbers has been issued (STEP 3104), and when the judgment is no, it stands by until the object numbers are released (STEP 3105). The object number issuance unit 254 proceeds to STEP 3102 after the object numbers are released in order to issue new object numbers for those which have been released. In other words, for example, if it is possible to simultaneously manage 20 object numbers and it receives an issuance request for 30 object numbers from the host device 2, the object number issuance unit 254 issues 20 object numbers and replies to the host device 2. Thereafter, with respect to the remaining 10 object numbers, the object numbers issuance unit 254 issues a new object number for each release of an issued object number and replies to the host device 2.

Referring back to FIG. 25, the object setting unit 255 processes command data ([o:mkim] command) relating to the setting of print objects. The object setting unit 255 prepares print setting information relating to the setting of the print objects in accordance with the contents of the parameter unit contained in this command data, and outputs this to the print setting information storage unit 245.

The page setting termination unit 256 processes command data ([p:endp] command) relating to the termination of the page setting. Upon receiving this command data the page setting termination unit 256 performs termination processing of the page setting and notifies this to the object requesting unit 261 described later.

Figure 26:
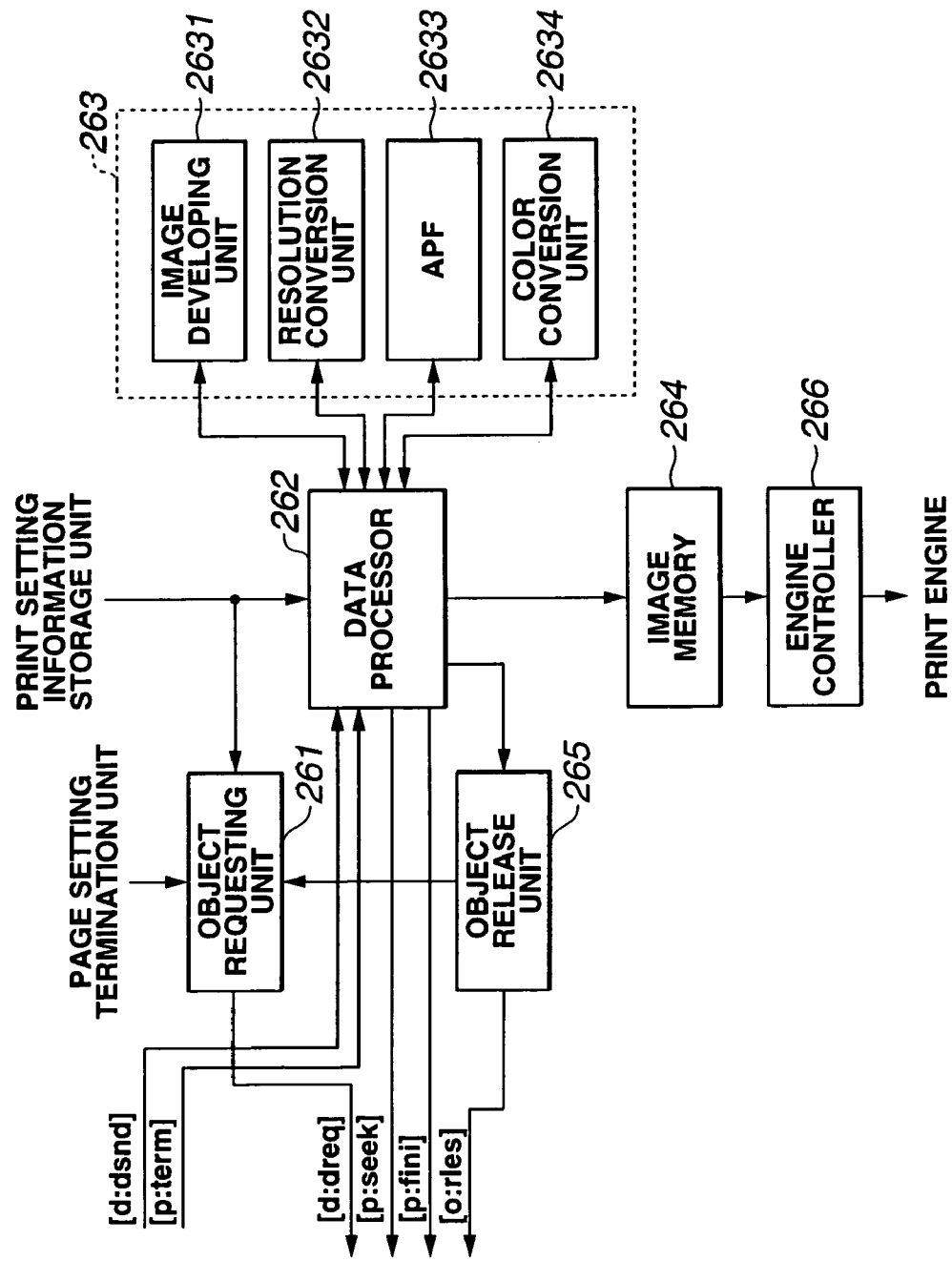
FIG. 26 is a block diagram showing the functional structure of the print processor.

FIG. 26 is a block diagram showing the functional structure of the print processor 246. In FIG. 26, the object requesting unit 261 prepares command data prepares command data ([d:dreq] command) relating to the data request in order to request print object data to the host device 2, and outputs this to the communication I/F unit 241. The object requesting unit 261 specifies print objects in accordance with the print setting information stored in the print setting information storage unit 245, and requests data for each print object. Here, the object requesting unit 261 designates the length (bytes) of data to be requested. That is, the object requesting unit 61 specifies in a raster order the print objects arranged in the print page area in accordance with the prepared print setting information, determines the data length to be requested in accordance with the usage condition of the buffer provided to such print object, and makes a request to the host device 2 using the object number of such print object.

The data processor 262 processes command data ([d:dsnd]) relating to data transmission. In other words, the data processor 262 makes the data processing module 263 process the print object data contained in the command data relating to data transmission sent from the host device 2 in response to the command data relating to the data request in accordance with the print setting information storage unit 245. Then, the data processor 262 outputs to the image memory 264 the final bit map data obtained in a raster format. Thereby, obtained is prescribed band area worth of bit map data in which the print object is developed in the object developmental area set to the page printing area. Therefore, when the automatic arrangement of print objects is designated, print objects will be developed in the object developmental area of prescribed partial areas formed by dividing the page printing area.

In this embodiment, the data processing module 263 comprises an image development unit 2631, resolution converter 2632, APF 2633 and color converter 2634. The data processor 262 further comprises an operation area (buffer) in a number equivalent to the number of issued object numbers, and it is preferable to store information relating to how many bytes of data have been obtained from the host device 2, to what band number has been developed, and to what line of bit map data has been developed.

The image developing unit 2631 develops (decompresses) the print object data transmitted in a compressed format, and restores this data to the original print object data. The resolution converter 2632 converts the resolution of the restored print object data in accordance with the print setting information stored in the print setting information storage unit 245. For example, when a developmental area of 2×3 (inch) is designated with the [o:mkim] command and the resolution is indirectly designated as 720 (dpi) with the [m:qlty] command, printed will be bit map data having an image size of 1440×2160 (dot). However, the image size of print objects sent from the host device 2 is not necessarily this size each time. Thus, if the print object sent from the host device 2 is smaller than the image size for printing, interpolation processing is performed. Contrarily, if the print object sent from the host device 2 is larger than the image size for printing, compression processing is performed. Such interpolation processing and compression processing shall be referred to as resolution conversion hereunder. If designation is made such that the print object fits exactly in the developmental area by changing the aspect ratio with the "F" parameter of the [o:mkim] command, resolution conversion is conducted by changing the conversion ratio (interpolation/compression) between the vertical direction and the horizontal direction. The APF unit 2633 corrects the image in accordance with designation when an APF designation is made to the print setting information relating to the print quality. Corrections of an image, for example, include tone adjustment, brightness enhancement, sharpness, etc. Moreover, it may also utilize the statistical data of the image. The color converter 2634 converts data represented in 8 bits with the respective colors of BRG into data represented in 8 bits with the respective colors of CMYK. Here, the color converter 2634 refers to the reference table (LUT) for color conversion if this is designated in the print setting information.

When the data processor 262 terminates the development of print objects by making the data processing module 263 perform pertinent processing, it notifies the object number of such print object to the object release unit 255. Upon the object release unit 255 receiving this, it outputs command data ([o:rles]) relating to release of objects and notifies the release of such print object to the object number issuance unit 254. The object issuance unit 254 sends a new object number to the host device 2 when an object number is released. Thereby, the host device 2 sets the print object based on the newly issued object number. Moreover, as described above, the object number issuance unit 254 does not issue an object number if the number of object numbers requested from the host device 2 has already been issued.

The image memory 264 stores bit map data in a raster format processed by the data processing module 263. The engine control unit 266 supplies image data stored in the image memory 264 to the print engine unit 247.

3-2 Functional Structure of the Host Device

Figure 27:
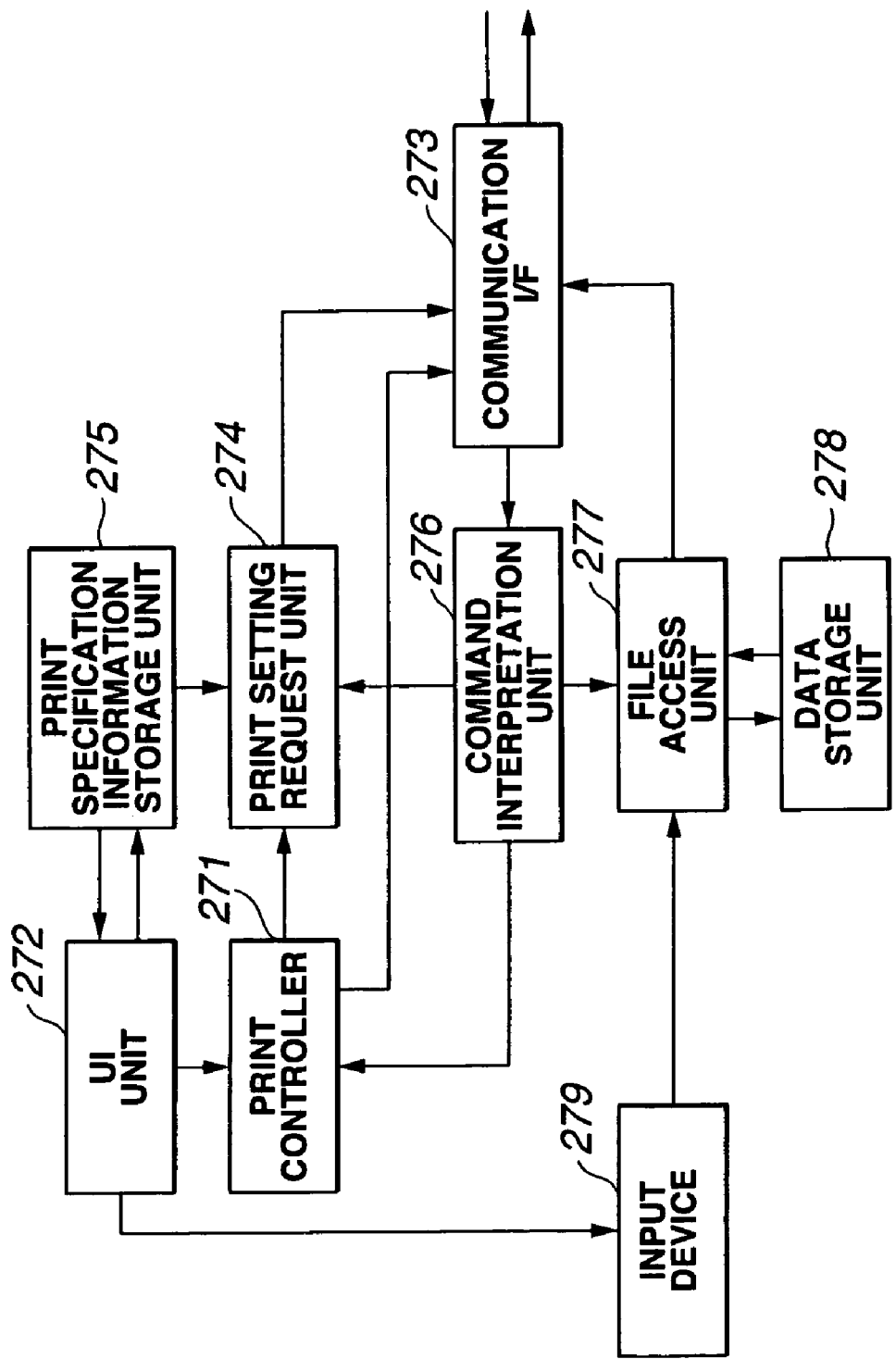
FIG. 27 is a block diagram showing the functional structure of the host device.

FIG. 27 is a block diagram showing the functional structure of the host device 2. In other words, FIG. 27 is a diagram functionally representing the host device 2 shown in FIG. 3.

The print control unit 271 performs the control relating to the progress of printing in accordance with the print commencement instruction or print Suspension instruction provided from the user interface 272 (corresponds to the user interface 34 shown in FIG. 3). When it is instructed to suspend printing, the print control unit 271 outputs command data ([p:term] command) relating to the page processing suspension of printer 1 to the communication I/F unit 273.

The print setting request unit 274 prepares command data ([m:qlty] command etc.) containing print specification information in the parameter unit by referring to the print specification information storage unit 275, and outputs this to the communication I/F 273. Print specification information includes information related to print quality, page format, and so on. Print specification information is set in advance, or input from the user interface 272.

Upon receiving command data from the printer 1 via the communication I/F unit 273, the command interpretation unit 276 interprets the command contained in this command data and performs control such the processing according to such interpretation results is conducted. The file access unit 277 is for writing or reading data by accessing the data storage unit 278. Upon receiving command data ([d:dreq] command) relating to the data request, the file access unit 277 reads print object data designated with the parameter unit from the data storage unit 278, prepares command data ([d:dsnd] command) relating to data transmission to be included in the parameter unit, and outputs this to the communication I/F unit 273. The input device 279 stores obtained image data in the data storage unit 278 via the file access unit 277 in accordance with the input instructions provided from the user I/F unit 272.

Figure 28:
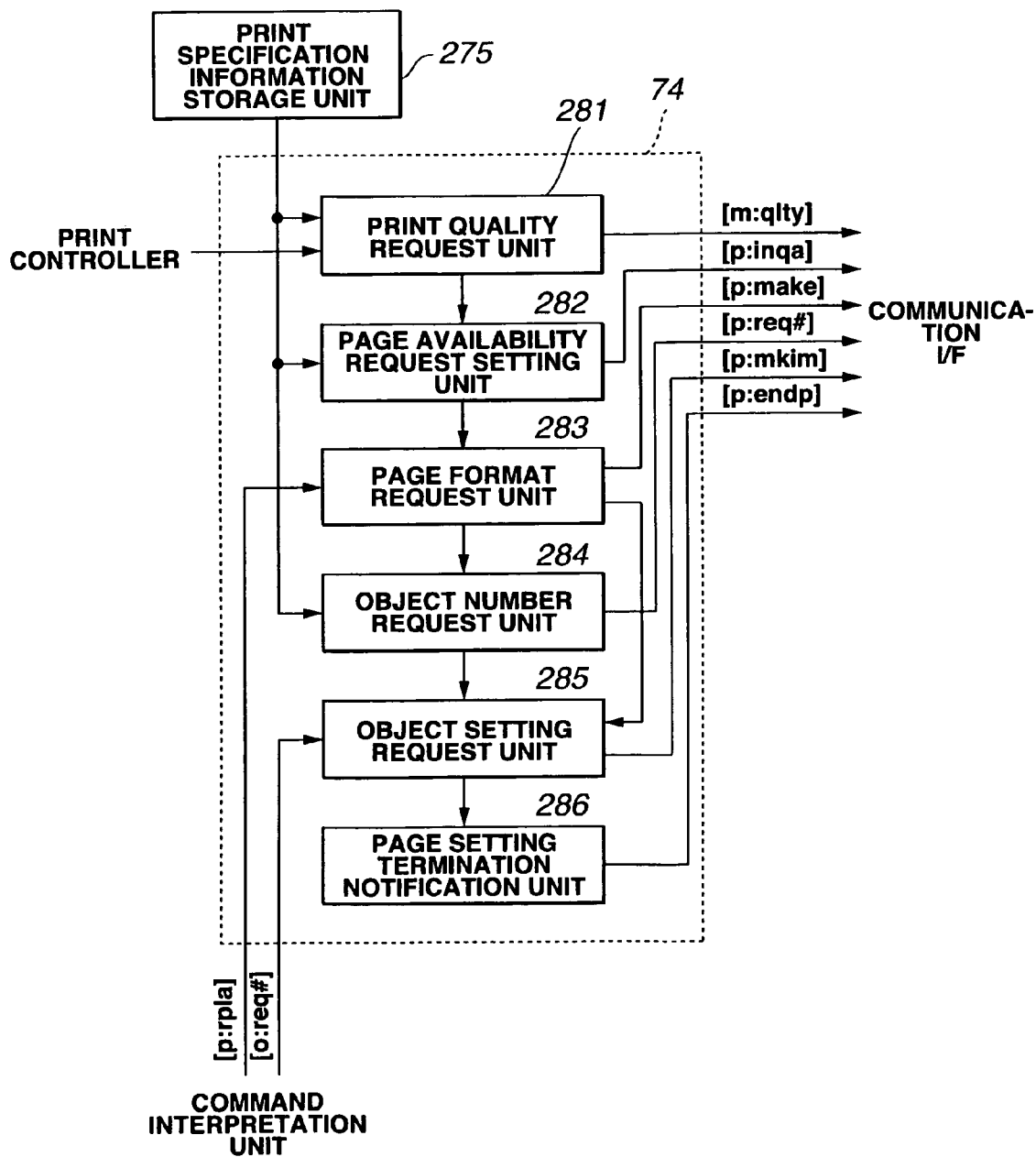
FIG. 28 is a block diagram showing the functional structure of the print setting request unit.

FIG. 28 is a block diagram showing the functional structure of the print setting request unit 274. In FIG. 28, the print quality setting request unit 281 prepares command data relating to the print quality setting based on the print specification information stored in the print specification information storage unit 275, and outputs this to the communication I/F 273. The page availability request unit 282 outputs command data relating to the inquiry on the range of page availability to the communication I/F unit 273. In response to this command data, command data ([p:rpla] command) relating to the reply on the range of page availability sent from the printer 1 is input to the page format request unit 283 via the command interpretation unit 276. The page format request unit 283 prepares command data ([p:make] command) relating to the page format such as the size and method of arranging the page printing area in accordance with the print specification information stored in the print specification information storage unit 275 and the range of page availability obtained from the printer 1. The object number request unit 284 outputs command data ([o:req#] command) relating to the issuance of object numbers in order to request necessary object numbers to the printer 1 based on the print specification information stored in the print specification information storage unit 287. The command data ([o:iss#] command) relating to the issuance of object numbers sent from the printer 1 in response to this command data is input to the object setting request unit 285. The object setting request unit 285 prepares command data ([o:mkim] command) relating to the setting of the print object based on the page format set by the page format request unit 283. The setting of the print object is conducted for each print object identified by object numbers. The page setting termination notification unit 286 prepares command data for notifying to the printer 1 that the setting of one page worth ([p:endp] command) of print specification has been terminated.

4 Explanation of Operation 4-1 Print Setting Processing

Figure 29:
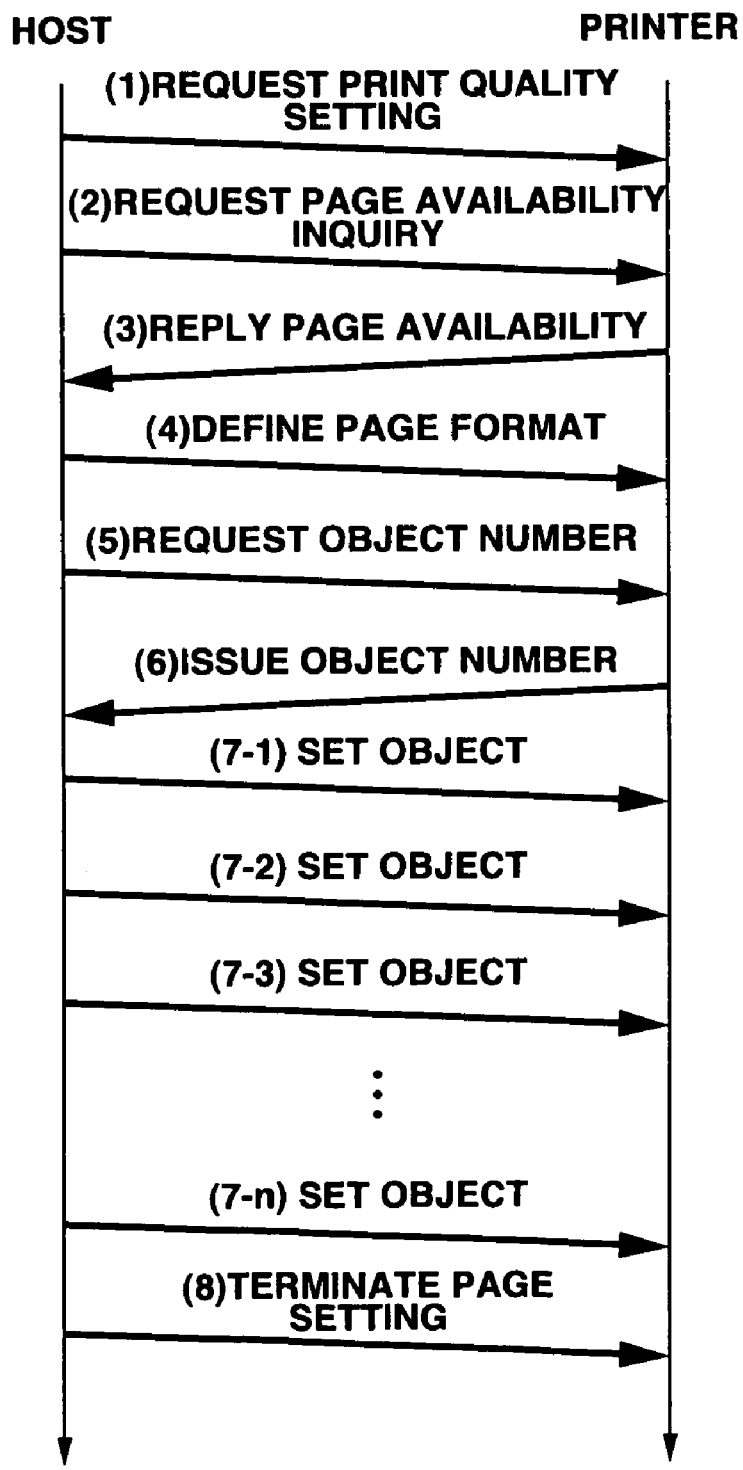
FIG. 29 is a timing chart for explaining the print setting processing of the print system.

FIG. 29 is a timing chart for explaining the print setting processing of the print system according to the present embodiment.

(1) When a print commencement instruction is provided by the user, the host device 2 sends command data relating to the print quality setting to the printer 1. The printer 1 receives this command data and prepares print setting information relating to the print quality in accordance with its characteristic information.

(2) The host device 2 sends command data relating to the inquiry on the range of page availability to the printer 1.

(3) The printer 1 receives this command data and sends command data relating to the reply on the range of page availability to the host device 2.

(4) The host device 2 receives this command data and prepares a page format based on this range of page availability and sends command data relating to such page format to the printer 1.

(5) After requesting the page format to the printer, the host device 2 sends command data relating to an issuance request of the object number for requesting the issuance of object numbers necessary in printing print objects to the printer 1.

(6) The printer receives command data relating to the issuance request of object numbers, and in order to notify the host device 2 of the object numbers that it can simultaneously manage, it sends command data relating to the issuance of object numbers to the host device 2.

(7) The host device 2 sends to the printer 1 command data relating to the object setting regarding the respective print objects in accordance with the object number permitted by the printer 1.

(8) The host device 2 sends to the printer 1 command data relating to the page setting completion when one page worth of setting is completed by notifying the printer 1 of the settings for the respective print objects. The printer 1 begins the next data transmission and print processing upon receiving this command data.

4-2 Data Transmission and Print Processing

Figure 30:
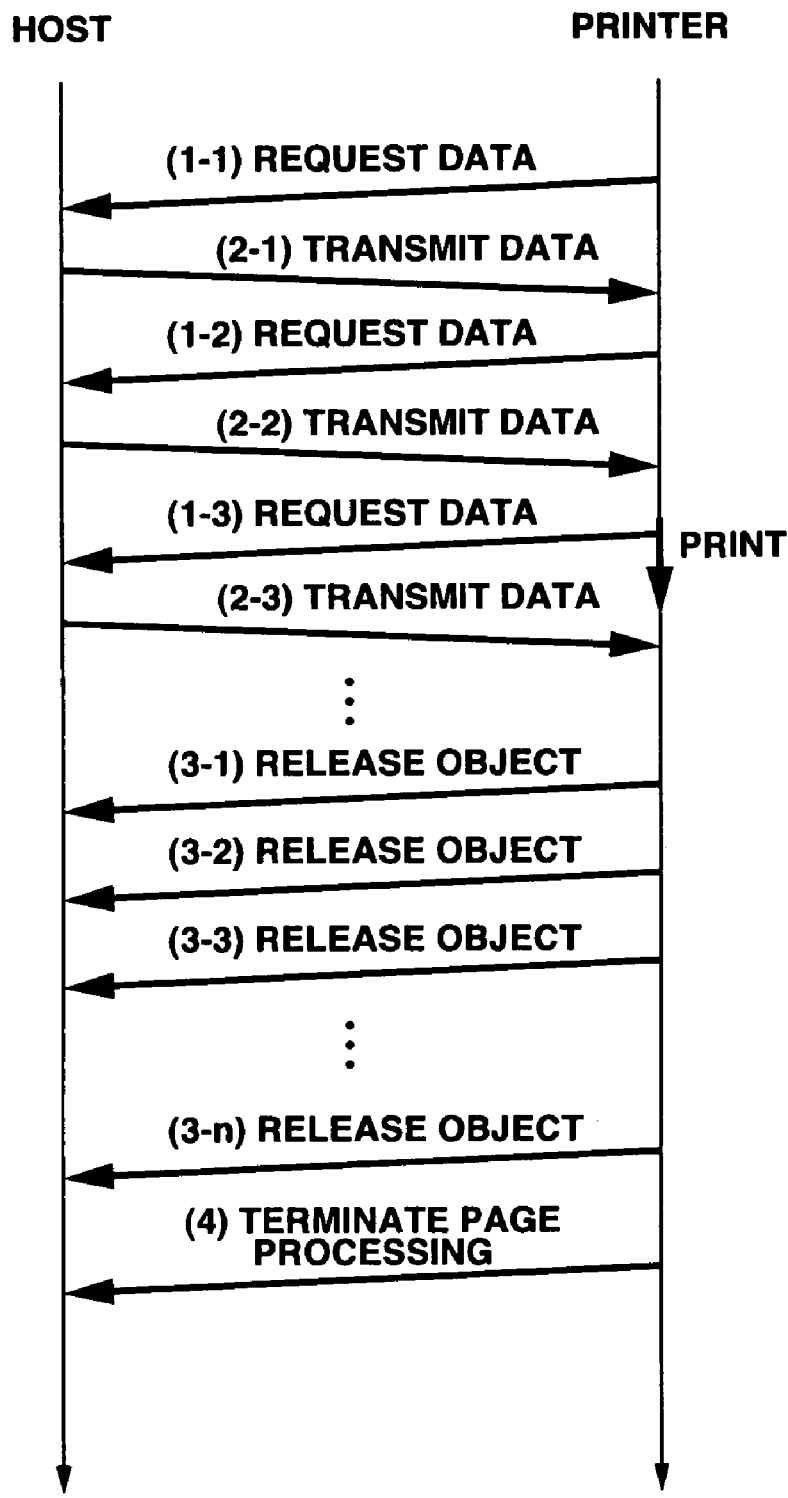
FIG. 30 is a timing chart for explaining the data transmission processing of the print system.

FIG. 30 is a timing chart for explaining the data transmission processing of the print system according to the present embodiment.

(1) The printer 1 receives command data relating to the data request, and in order to request print object data, it sends command data relating to the data request to the host device 2.

(2) The host device 2 receives command data relating to the data request, reads the print object data in accordance with the parameter designation, and sends command data relating to the data transmission to the printer 1.

(3) The printer 1 receives print object data and, when the pertinent processing is completed, it outputs command data relating to the release of objects to the host device 2 in order to notify the host device 2 of the release of such print objects.

(4) The printer 1 receives object data necessary for one page worth of printing and, at the point of the next communication becoming possible, sends command data relating the page processing completion to the host device 2.

4-3 Print Suspension

Figure 33:
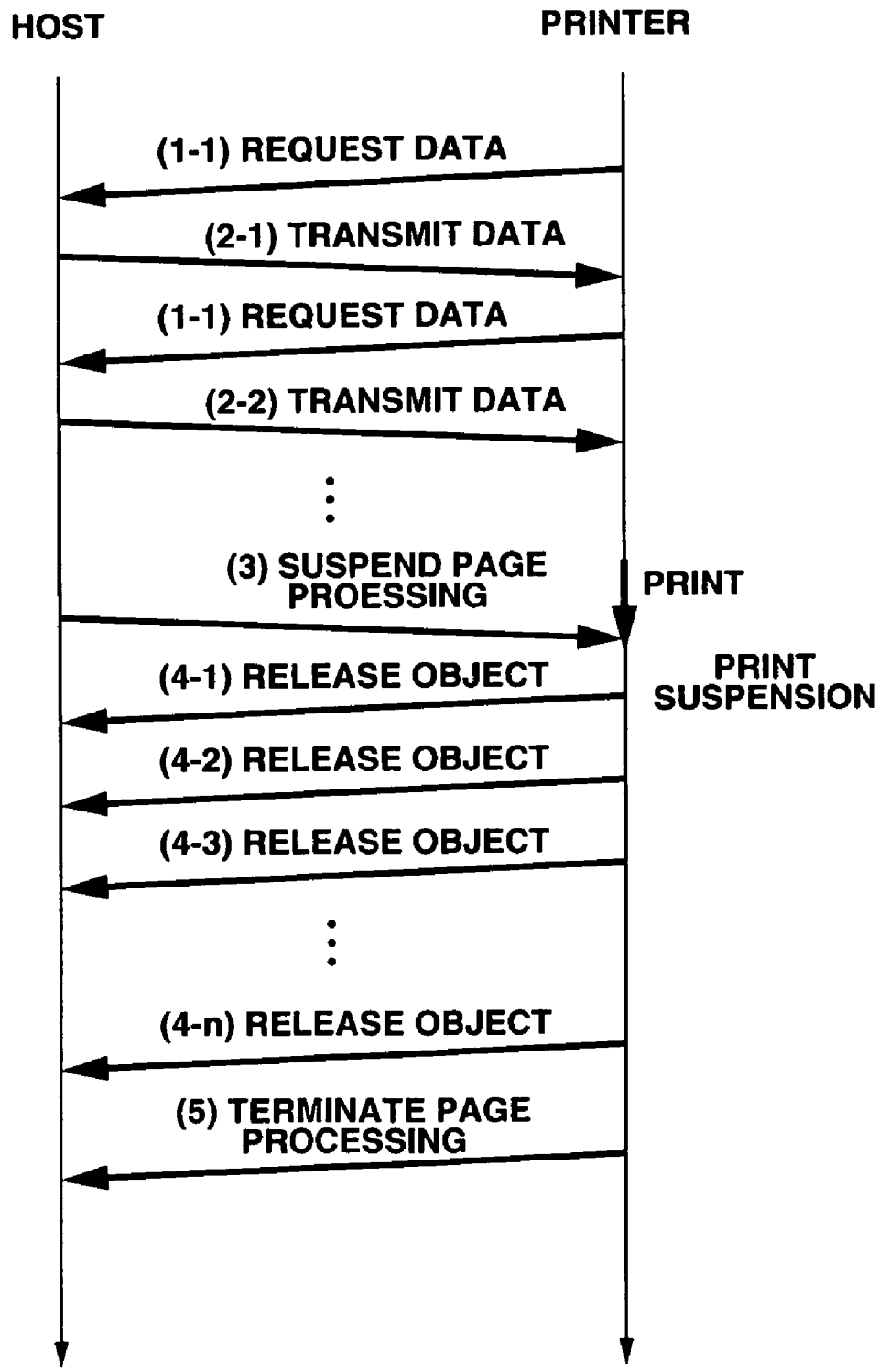
FIG. 33 is a timing chart for explaining the data transmission processing of the print system.

FIG. 33 is a timing object chart for explaining the data transmission processing of the print system according to the present embodiment.

(1) The printer receives command data relating to the page setting completion, and in order to request print object data, it sends command data relating to the data request to the host device 2.

(2) The host device 2 receives command data relating to the data request, reads print object data in accordance with the designation of the parameter data, and sends command data relating to the data transmission to the printer 1.

(3) The host device 2 sends to the printer 1 command data relating to the page processing suspension due to instructions of the user or generation of errors. The printer 1 suspends its processing if it is in the midst of print processing (including developmental processing).

(4) The printer 1 outputs to the host device 2 command data relating to the object release of all print objects.

(5) The printer 1 sends to the host device 2 command data relating to page processing completion for notifying the host device 2 that the processing of all print objects has been suspended.

The aforementioned embodiment is an exemplification for explaining the present invention and does not intend to limit this invention to such embodiment. The present invention may be worked in various forms so as long as the gist thereof is not deviated. For example, although the operation of the aforementioned function realization means was explained sequentially, it is not particularly limited thereto. Therefore, so as long as inconsistencies do not arise in the operation, the present invention may be structured such that the order of processing is changed or made to perform in parallel.

According to the present invention, it is possible to make a printer print the document data in the host device without the host device requiring conventional print drivers. Thus, an inexpensive host device can make a printer print directly without having to go through a computer.

What is claimed is:

1. A communication method of a host device connected to a printer, comprising:
   sending, to the printer, a command relating to an object identifier request;
   receiving, from the printer in response to the command relating to the object identifier request, information corresponding to a number of the printer's usable object identifiers;
   sending, to the printer, a first print setting information and object identifiers corresponding to the number of printer's usable object identifiers, wherein each of the object identifiers is associated with one of a plurality of print objects;
   receiving from the printer, a data request for each of the plurality of print objects using the object identifiers; and
   sending, to the printer, the print object data for each of the plurality of print objects.

2. The communication method according to claim 1, comprising:
   obtaining characteristic information of said printer;
   preparing first print setting information by the host device based on said obtained characteristic information; and
   sending said prepared first print setting information to said printer.

3. A host device connected to a printer, comprising:
   a communication interface to communicate data with the printer, wherein the communication interface includes functionality to:
   send, to the printer, a command relating to an object identifier request;
   receive, from the printer in response to the command relating to the object identifier request, information corresponding to a number of printer's usable object identifiers;
   send, to the printer, a first print setting information and the object identifiers corresponding to the number of printer's usable object identifiers, wherein each of the object identifiers is associated with one of a plurality of print objects;
   receive, from the printer, a data request for each of the plurality of print objects using the object identifiers; and
   send, to the printer, the print object data for each of the plurality of print objects.

4. A communication method of a digital camera connected to a printer, comprising:
   sending a request command to the printer;
   receiving information corresponding to a number of the printer's usable object identifiers from the printer in response to the request command;
   sending, to the printer, a first print setting information and object identifiers corresponding to the number of printer's usable object identifiers, wherein each of the object identifiers is associated with one of a plurality of print objects;
   receiving from the printer, a data request for each of the plurality of print objects using the object identifiers; and
   sending, to the printer, the print object data for each of the plurality of print objects.

5. A host device connected to a printer, comprising:
   a communication interface to communicate data with the printer, wherein the communication interface includes functionality to:
   send a request command to the printer;
   receive information corresponding to a number of the printer's usable object identifiers from the printer in response to the request command;
   send, to the printer, a first print setting information and object identifiers corresponding to the number of printer's usable object identifiers, wherein each of the object identifiers is associated with one of a plurality of print objects;
   receive from the printer, a data request for each of the plurality of print objects using the object identifiers; and
   send, to the printer, the print object data for each of the plurality of print objects.

* * * * *